US012604277B2

(12) United States Patent
Xing

(10) Patent No.: US 12,604,277 B2
(45) Date of Patent: Apr. 14, 2026

(54) METHOD FOR POWER CONTROL, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Jinqiang Xing, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 549 days.

(21) Appl. No.: 18/106,043

(22) Filed: Feb. 6, 2023

(65) Prior Publication Data

US 2023/0189161 A1    Jun. 15, 2023

Related U.S. Application Data

(63) Continuation of application No. PCT/CN2020/108014, filed on Aug. 7, 2020.

(51) Int. Cl.
    *H04W 52/14*        (2009.01)
    *H04W 72/21*        (2023.01)
(52) U.S. Cl.
    CPC ......... *H04W 52/146* (2013.01); *H04W 72/21* (2023.01)
(58) Field of Classification Search
    CPC .... H04W 52/14; H04W 52/146; H04W 72/21
    See application file for complete search history.

(56) References Cited

U.S. PATENT DOCUMENTS

| | | | | | |
|---|---|---|---|---|---|
| 4,151,459 | A | * | 4/1979 | Fayolle | G01R 31/11 |
| | | | | | 324/533 |
| 10,848,999 | B2 | * | 11/2020 | Yang | H04W 72/56 |
| 11,147,013 | B2 | * | 10/2021 | Tang | H04W 52/367 |
| 11,228,990 | B2 | * | 1/2022 | Jeon | H04W 52/50 |
| 11,317,359 | B2 | * | 4/2022 | Nangia | H04W 72/0453 |
| 11,528,711 | B2 | * | 12/2022 | Ly | H04L 5/0094 |
| 11,902,033 | B2 | * | 2/2024 | Deenoo | H04L 1/0021 |
| 11,924,819 | B2 | * | 3/2024 | Cai | H04W 52/225 |

(Continued)

FOREIGN PATENT DOCUMENTS

| | | | | |
|---|---|---|---|---|
| CN | 110381576 A | * | 10/2019 | ......... H04W 52/367 |
| CN | 110831210 A | | 2/2020 | |

(Continued)

OTHER PUBLICATIONS

First Office Action issued in corresponding European application No. 20948305.6, mailed May 16, 2024.

(Continued)

*Primary Examiner* — Hai V Nguyen
(74) *Attorney, Agent, or Firm* — BAYES PLLC

(57)    ABSTRACT

Provided in the embodiments of the present application are a method for power control, a terminal device, and a network device. The method includes: performing, by a network device, uplink power control according to first transmit information and second transmit information. The first transmit information is transmit information of a terminal device on a Supplementary Uplink (SUL) band during a first time period, and the second transmit information is transmit information of the terminal device on a Normal Uplink (NUL) band during the first time period.

14 Claims, 4 Drawing Sheets

100

(56) References Cited

U.S. PATENT DOCUMENTS

| | | | |
|---|---|---|---|
| 12,035,285 B2 * | 7/2024 | Xing | H04W 52/367 |
| 12,096,447 B2 * | 9/2024 | Zhang | H04L 5/1469 |
| 12,101,721 B2 * | 9/2024 | Xing | H04W 52/146 |
| 2017/0048740 A1 * | 2/2017 | Yang | H04L 1/003 |
| 2020/0053779 A1 * | 2/2020 | Jeon | H04L 5/0051 |
| 2020/0100194 A1 * | 3/2020 | Nangia | H04L 5/005 |
| 2020/0274657 A1 * | 8/2020 | Deenoo | H04L 5/0053 |
| 2020/0351801 A1 * | 11/2020 | Jeon | H04W 52/48 |
| 2021/0068115 A1 * | 3/2021 | Gotoh | H04W 72/0453 |
| 2021/0250855 A1 * | 8/2021 | Tang | H04W 52/367 |
| 2021/0266963 A1 * | 8/2021 | Noh | H04W 74/006 |
| 2021/0274483 A1 * | 9/2021 | Zhang | H04W 72/23 |
| 2022/0022177 A1 * | 1/2022 | Xing | H04W 72/51 |
| 2022/0124629 A1 * | 4/2022 | Xing | H04W 52/02 |
| 2022/0224474 A1 * | 7/2022 | Ly | H04L 5/0048 |
| 2022/0248345 A1 * | 8/2022 | Nangia | H04W 52/146 |
| 2022/0322356 A1 * | 10/2022 | Ly | H04L 5/001 |
| 2022/0368468 A1 * | 11/2022 | Xiong | H04W 74/0833 |
| 2023/0078181 A1 * | 3/2023 | Ghanbarinejad | H04W 52/383 370/318 |
| 2023/0080162 A1 * | 3/2023 | Ghanbarinejad | H04W 52/46 455/522 |
| 2023/0319728 A1 * | 10/2023 | Zhou | H04L 5/1461 370/277 |
| 2023/0354433 A1 * | 11/2023 | Xue | H04W 74/0833 |
| 2023/0388871 A1 * | 11/2023 | Guo | H04W 36/0069 |

FOREIGN PATENT DOCUMENTS

| | | | | |
|---|---|---|---|---|
| CN | 112740766 A * | 4/2021 | | H04W 72/0453 |
| EP | 3836704 A1 * | 6/2021 | | H04W 72/21 |
| EP | 3883315 B1 * | 6/2024 | | H04L 5/0094 |
| WO | 2019193420 A1 | 10/2019 | | |
| WO | 2020061753 A1 | 4/2020 | | |
| WO | WO-2020248897 A1 * | 12/2020 | | H04W 52/367 |

OTHER PUBLICATIONS

Erik Dahlman et al: "5G NR: The Next Generation Wireless Access Technology", Aug. 17, 2018 (Aug. 17, 2018), XP055775576, ISBN: 978-0-12-814323-0.

Extended European Search Report issued in corresponding European application No. 20948305.6, mailed Sep. 6, 2023.

Vivo, "Discussion on different schemes for PC2 EN-DC (FDD+TDD)", 3GPP TSG-RAN WG4 Meeting #92 Ljubljana, Slovenia, Aug. 26-30, 2019; R4-1908862.

Oppo, "Discussion on NSA FDD-TDD HPUE SAR solutions", 3GPP TSG-RAN WG4 Meeting #90bis Xi'an, China, Apr. 8-12, 2019; R4-1903055.

Huawei et al., "Introduction of 6.2C.1 Configured transmitted power for SUL", R5-184823, 3GPP TSG-RAN WG5 Meeting #80 Gothenburg, Sweden, Aug. 20-24, 2018.

International Search Report issued in International application No. PCT/CN2020/108014, mailed May 7, 2021.

Written Opinion of the International Searching Authority issued in International application No. PCT/CN2020/108014, mailed May 7, 2021.

3GPP TS 38.101-1 V18.0.0 (Dec. 2022); Technical Specification Group Radio Access Network; NR; User Equipment (UE) radio transmission and reception; Part 1: Range 1 Standalone (Release 18).

China Telecom, "New WID: Power Class 2 UE for NR inter-band CA and SUL configurations with 2 bands UL", RP-201337, 3GPP TSG RAN Meeting #88e Electronic Meeting, Jun. 29-Jul. 3, 2020.

* cited by examiner

300

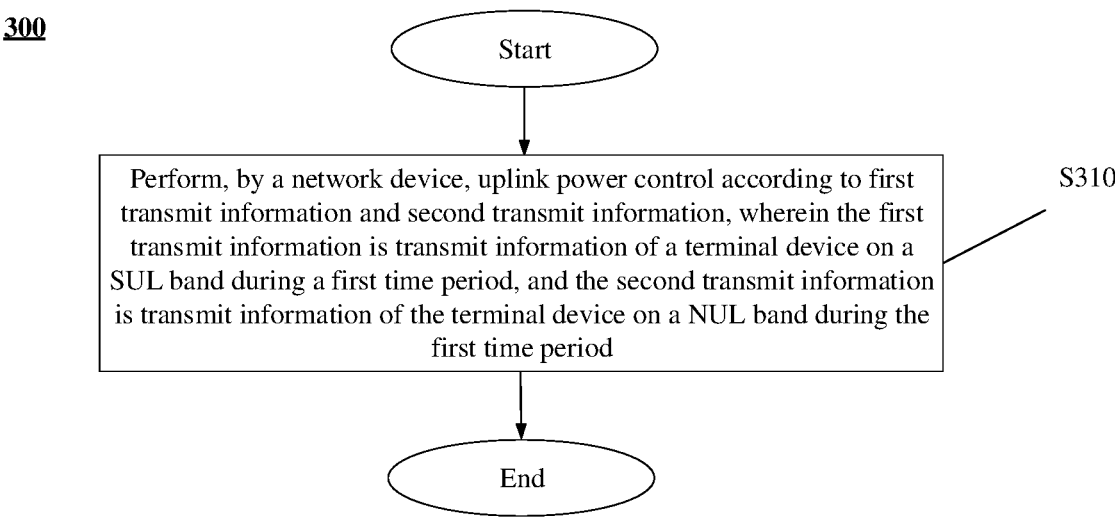

Start

Perform, by a network device, uplink power control according to first transmit information and second transmit information, wherein the first transmit information is transmit information of a terminal device on a SUL band during a first time period, and the second transmit information is transmit information of the terminal device on a NUL band during the first time period

S310

End

FIG. 4

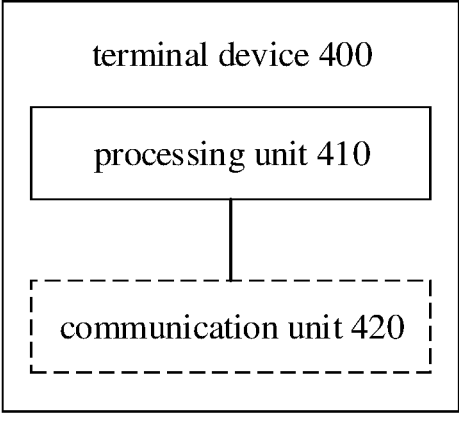

terminal device 400 processing unit 410 communication unit 420

FIG. 5

METHOD FOR POWER CONTROL, TERMINAL DEVICE, AND NETWORK DEVICE

CROSS-REFERENCE TO RELATED APPLICATION

This application is a continuation of International Application No. PCT/CN2020/108014, filed on Aug. 7, 2020, the content of which is incorporated herein by reference in its entirety.

TECHNICAL FIELD

Embodiments of the present disclosure generally relate to the communication technical field, and more specifically, to a power control method, a terminal device and a network device.

BACKGROUND

In the New Radio (NR) system, in order to improve the uplink coverage of a terminal device, time-division transmission of terminal device in a Supplementary Uplink (SUL) band and a Normal Uplink (NUL) band may be supported. However, in this case, how to perform power control to meet the radiation level requirement of electromagnetic wave Specific Absorption Rate (SAR) is an urgent problem to be solved.

SUMMARY

Embodiments of the present disclosure provide a power control method, a terminal device and a network device, which can perform power control for the terminal device in a case where the terminal device supports the time-division transmission on the SUL band and the NUL band, so as to meet the radiation index requirement of SAR.

According to a first aspect, there is provided a power control method, including:

performing, by a terminal device, uplink power control according to first transmit information and second transmit information, wherein the first transmit information is transmit information of the terminal device on a Supplementary Uplink (SUL) band during a first time period, and the second transmit information is transmit information of the terminal device on a Normal Uplink (NUL) band during the first time period.

According to a second aspect, there is provided power control method, including:

performing, by a network device, uplink power control according to first transmit information and second transmit information, wherein the first transmit information is transmit information of a terminal device on a Supplementary Uplink (SUL) band during a first time period, and the second transmit information is transmit information of the terminal device on a Normal Uplink (NUL) band during the first time period.

According to a third aspect, there is provided a terminal device configured to perform the method according to the first aspect.

Specifically, the terminal device includes functional unit(s) configured to perform the method according to the first aspect.

According to a fourth aspect, there is provided a network device configured to perform the method according to the second aspect.

Specifically, the network device includes functional unit(s) configured to perform the method according to the second aspect.

According to the fifth aspect, there is provided a terminal device including a processor and a memory, wherein the memory is used for storing a computer program, and the processor is configured to call and run the computer program stored in the memory to perform the method according to the first aspect.

According to the sixth aspect, there is provided a network device including a processor and a memory, wherein the memory is used for storing a computer program, and the processor is configured to call and run the computer program stored in the memory to perform the method according to the second aspect.

According to a seventh aspect, there is provided an apparatus configured to perform the method according to any one of the first and second aspects.

Specifically, the apparatus includes a processor configured to call and run a computer program from a memory to cause a device in which the apparatus is installed to perform the method according to any one of the first and second aspects.

According to an eighth aspect, there is provided a computer-readable storage medium for storing a computer program, wherein the computer program causes a computer to perform the method according to any one of the first and second aspects.

According to a ninth aspect, there is provided a computer program product including computer program instructions which cause a computer to perform the method according to any one of the first and second aspects.

According to a tenth aspect, there is provided a computer program. When the computer program runs on a computer, the computer is caused to perform the method according to any one of the first and second aspects.

Based on the above technical solutions, the terminal device or the network device can perform power control according to the transmit information of the terminal device on the SUL band during the first time period and the transmit information of the terminal on the NUL band during the first time period, thus meeting the radiation index requirement of SAR.

BRIEF DESCRIPTION OF THE DRAWINGS

FIG. 4 is a schematic flowchart of another power control method according to an embodiment of the present disclosure.

FIG. 5 is a schematic block diagram of a terminal device according to an embodiment of the present disclosure.

DETAILED DESCRIPTION

Figure 1:
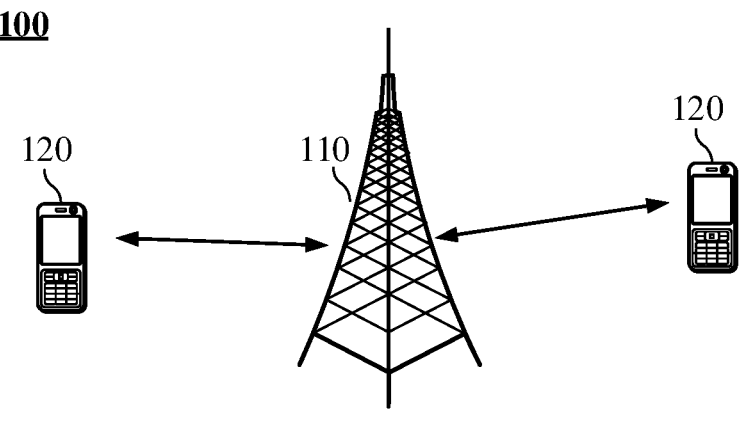
FIG. 1 is a schematic diagram of a communication system architecture in which embodiments of the present disclosure are applied.

The technical solutions in embodiments of the present disclosure will be described below with reference to the drawings in the embodiments of the present disclosure. Obviously, the described embodiments are part of the embodiments of the present disclosure, but not all of the embodiments. All other embodiments obtained by those of ordinary skill in the art based on the embodiments of described herein without creative work fall within the scope of protection of the present disclosure.

Technical solutions according to embodiments of the present disclosure can be applied to various communication systems, such as, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolution system of NR system, LTE-based access to unlicensed spectrum (LTE-U) system, NR-based access to unlicensed spectrum (NR-U) system, Non-Terrestrial Networks (NTN) system, Universal Mobile Telecommunication System (UMTS), Wireless Local Area Networks (WLAN), Wireless Fidelity (WiFi), 5th-Generation (5G) system, or other communication systems, etc.

Generally speaking, traditional communication systems support a limited number of connections and are easy to implement. However, with the development of communication technologies, mobile communication systems will not only support traditional communications, but also support, for example, Device to Device (Device to Device, D2D) communications, Machine to Machine (M2M) communications, Machine Type Communication (MTC), Vehicle to Vehicle (V2V) communications, or Vehicle to everything (V2X), etc. Embodiments of the present disclosure can be applied to these communications systems.

Optionally, the communication systems in embodiments of the present disclosure can be applied to a Carrier Aggregation (CA) scenario, can also be applied to a Dual Connectivity (DC) scenario, and can also be applied to a standalone (SA) network deployment scenario.

Optionally, the communication system in embodiments of the present disclosure can be applied in unlicensed spectrum. The unlicensed spectrum may also be considered as shared spectrum. Or, the communication system in embodiments of the present disclosure can also be applied in licensed spectrum. The licensed spectrum may also be considered as non-shared spectrum.

Embodiments of the present disclosure are described in combination with a terminal device and a network device. The terminal device may also be called User Equipment (UE), access terminal, user unit, user station, mobile station, mobile terminal, remote station, remote terminal, mobile device, user terminal, terminal, wireless communication device, user agent or user device, etc.

The terminal device can be a station (ST) in a WLAN, a cellular phone, a cordless phone, a Session Initiation Protocol (SIP) phone, a Wireless Local Loop (WLL) station, or a Personal Digital Assistant (PDA) device, a handheld device with wireless communication capabilities, a computing device or other processing device connected to a wireless modem, a vehicle-mounted device, a wearable device, or a terminal device in a next-generation communication system, such as a terminal device in the NR network or a terminal device in a future evolved Public Land Mobile Network (PLMN) network.

In embodiments of the present disclosure, the terminal device may be deployed on land, including indoor or outdoor, handheld, wearable or vehicle-mounted; or, the terminal device may be deployed on water (such as on ships, etc.); or, the terminal device may be deployed in the air (such as on aircraft, balloons, and satellites, etc.).

In embodiments of the present disclosure, the terminal device may be a mobile phone, a tablet computer (Pad), a computer with wireless transceiver function, a virtual reality (VR) terminal device, an augmented reality (AR) terminal device, a wireless terminal device in industrial control, a wireless terminal device in self driving, a wireless terminal devices in remote medical, a wireless terminal device in smart grid, a wireless terminal device in transportation safety, a wireless terminal device in smart city, or a wireless terminal device in smart home, etc.

By way of example and not limitation, in embodiments of the present disclosure, the terminal device may also be a wearable device. The wearable device can also be referred to as a wearable smart device, which is a general term for applying wearable technology to intelligently design everyday wear and develop wearable devices, such as glasses, gloves, watches, clothing and shoes. A wearable device is a portable device that is worn directly on the body or integrated into users' clothes or accessories. The wearable device is not only a hardware device, but also realize powerful functions through software support, data interaction, and cloud interaction. Generalized wearable smart devices include full-featured and large-sized devices which can realize complete or partial functions that do not depend on smart phones, such as smart watches or smart glasses, and devices that only focus on a certain type of application functions, and need to cooperate with other devices like smart phones, such as smart bracelets for sign monitoring, or smart jewelry.

In embodiments of the present disclosure, the network device may be a device for communicating with a mobile device. The network device may be an Access Point (AP) in WLAN, a base station (BTS, Base Transceiver Station) in GSM or CDMA, or a base station (NB, NodeB) in WCDMA, an evolved base station in LTE (Evolutional Node B, eNB or eNodeB,), or a relay station or an access point, or a vehicle-mounted device, a wearable device, a network device or base station (gNB) in an NR network, or a network device in future evolved PLMN network or a network device in a NTN network.

By way of example and not limitation, in embodiments of the present disclosure, the network device may have mobile characteristics, for example, the network device may be a mobile device. Optionally, the network device may be a satellite, a or balloon station. For example, the satellite may be a Low Earth Orbit (LEO) satellite, a Medium Earth Orbit (MEO) satellite, a Geostationary Earth Orbit (GEO) satellite, or a High Elliptical Orbit (HEO) satellite, etc. Optionally, the network device may also be a base station deployed on land, or water, etc.

In embodiments of the present disclosure, the network device provides services for a cell, and the terminal device communicates with the network device through transmission resources (for example, frequency domain resources, or spectrum resources) used by the cell. The cell may be a cell corresponding to the network device (for example, base station). The cell may belong to a macro base station or a base station corresponding to a small cell. The small cell here may include: a metro cell, a micro cell, a pico cell, a femto cell, etc. These small cells have the characteristics of small coverage and low transmit power, and are suitable for providing high-speed data transmission services.

Exemplarily, a communication system 100 to which embodiments of the present disclosure may be applied is shown in FIG. 1. The communication system 100 may include a network device 110. The network device 110 may be a device that communicates with a terminal device 120 (or referred to as a communication terminal, or a terminal). The network device 110 may provide communication coverage for a particular geographic area and may communicate with terminal devices within the coverage area.

FIG. 1 exemplarily shows one network device and two terminal devices. According to some embodiments, the communication system 100 may include multiple network devices and the coverage of each network device may include other numbers of terminal devices, and embodiments of the present disclosure do not impose specific limitations on this.

According to some embodiments, the communication system 100 may further include other network entities such as a network controller, or a mobility management entity, which are not limited in embodiments of the present disclosure.

It should be understood that a device having a communication function in the network/system in embodiments of the present disclosure may be referred to as a communication device. Taking the communication system 100 shown in FIG. 1 as an example, the communication device may include a network device 110 and terminal devices 120 with a communication function, and the network device 110 and the terminal devices 120 may be the specific devices described above, which will not be repeated here. The communication device may further include other devices in the communication system 100, such as other network entities like a network controller or a mobility management entity, which are not limited in embodiments of the present disclosure.

It should be understood that the terms "system" and "network" are often used interchangeably herein. The term "and/or" herein is only an association relationship to describe associated objects, indicating that there can be three kinds of relationships, for example, A and/or B can mean three cases: A alone, B alone, and A and B together. In addition, the character "/" herein generally indicates that the related objects are an "or" relationship.

The terminologies used in the embodiments section of the present disclosure are intended only to explain example embodiments of the present disclosure and are not intended to limit the present disclosure. The terms "first", "second", "third, and "fourth" in the specification and claims of the present disclosure and in the accompanying drawings described herein are used to distinguish between different objects and are not intended to describe a particular order. In addition, the terms "include(s)" and "have(has)" and any variations thereof are intended to cover non-exclusive inclusion.

It is to be understood that "indication/indicate" referred to in embodiments of the present disclosure may be a direct indication, an indirect indication, or representing an association relationship. For example, A indicates B can mean that A indicates B directly, for example, B may be obtained through A; or A indicates B can mean that A indicates B indirectly, for example, A indicates C and B may be obtained through C; or, A indicates B can mean that A and B have an association relationship.

In the description of embodiments of the present disclosure, the term "correspond/corresponding" may indicate a direct correspondence or indirect correspondence between two objects, or may indicate an association relationship between the two objects, or may be a relationship of indicating and being indicated, configuring and being configured, etc.

SAR is an indicator parameter to measure the intensity of electromagnetic radiation from a terminal to the human body. In order to avoid the harm of electromagnetic radiation devices such as cell phones to the human body, the standard has strict level requirements for the SAR value of cell phone radiation, and the terminal cannot exceed the limit value.

SAR indicator is an average measurement value of a terminal within a period of time, and has the characteristics that the higher the terminal transmit power, the higher the SAR value, and the longer the uplink transmission time, the higher the SAR.

In order to meet SAR compliance, a terminal usually uses, for example, a distance sensor to detect a distance between the terminal and the human body, and performs power back-off when it is close to the human body to reduce the transmit power and avoid exceeding the SAR limit. Previously, the method effectively solved problem of exceeding the SAR limit. However, with the recent tightening of SAR testing method (the test is no longer testing one terminal posture but all cell phone faces and edges need to be close to the human body and tested for SAR), this solution is increasingly unable to address the SAR radiation problem of terminals in multiple postures, and a more general solution is needed.

The emergence of high-power terminals (26 dBm) in LTE makes the SAR non-compliance problem attract more and more attention. Compared with ordinary terminals (23 dBm), the high-power terminals have higher transmit power, and accordingly the SAR value is also higher. In order to solve the problem of exceeding SAR limit by high power terminal in LTE, a method of limiting the uplink and downlink slot ratio has emerged, i.e., a static uplink and downlink slot ratio is generally adopted in the existing LTE network, as shown in Table 1 below. By excluding the uplink-downlink configurations 0 and 6 (in which the percentage of uplink exceeds 50%), the uplink transmission time of the terminal is limited to less than 50%, which to some extent eliminates the problem of high SAR value caused by high power terminals.

Later, high power terminals were also introduced into NR, and standardization also tried to solve the SAR problem in a similar way as LTE, but it was difficult to reach a consensus. The reason is that LTE has only 7 uplink-downlink configurations and they are all static configurations, but NR has more than 60 configurations (as shown in Table 2 below), and each configuration has flexible symbols that can be configured for uplink or downlink. This makes it very difficult to calculate the uplink percentage for each uplink-downlink configuration. To solve this problem, a maximum uplink duty cycle (maxULdutycycle) for a terminal device is introduced, i.e., the terminal reports to the network the maximum uplink duty cycle it supports in a certain frequency band, and when the uplink duty cycle scheduled by the network exceeds this capability, the terminal uses a power back-off to reduce the SAR value. This solution can solve the problem of exceeding SAR limit for a standalone terminal which performs transmission in one NR band. However, this solution is not applicable to the problem of simultaneous transmissions on multiple bands.

TABLE 1

| Uplink-downlink | Downlink-to-Uplink Switch-point | Subframe number | | | | | | | | | |
|---|---|---|---|---|---|---|---|---|---|---|---|
| configuration | periodicity | 0 | 1 | 2 | 3 | 4 | 5 | 6 | 7 | 8 | 9 |
| 0 (60%) | 5 ms | D | S | U | U | U | D | S | U | U | U |
| 1 (40%) | 5 ms | D | S | U | U | D | D | S | U | U | D |
| 2 (25%) | 5 ms | D | S | U | D | D | D | S | U | D | D |
| 3 (30%) | 10 ms | D | S | U | U | U | D | D | D | D | D |
| 4 (20%) | 10 ms | D | S | U | U | D | D | D | D | D | D |
| 5 (10%) | 10 ms | D | S | U | D | D | D | D | D | D | D |
| 6 (50%) | 5 ms | D | S | U | U | U | D | S | U | U | D |

In Table 1, "D" represents a downlink subframe, "U" indicates an uplink subframe, and "S" indicates a special subframe.

TABLE 2

| format | symbol in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | | | | | | | ... | | | | | | | |
| 61 | D | D | X | X | X | X | U | D | D | X | X | X | X | U |
| 62-255 | | | | | | | Reserved | | | | | | | |

In Table 2, "D" represents a downlink symbol, "U" represents an uplink symbol, and "X" represents a flexible symbol.

The SUL band is a spectrum utilization method proposed to solve the uplink coverage of terminals. Usually, in the NR high band, the uplink coverage is weaker than the downlink coverage due to the limited transmit power of a terminal. Thus, the uplink access capability of the terminal at the edge of a cell is insufficient. One way to improve uplink coverage is to use a part of the uplink spectrum in the low band for the NR high band to increase uplink coverage. However, since the low band is only used for uplink, it is called the SUL band. The SUL band cannot be used alone, and the SUL band needs to be used with the normal NR band (because the SUL band lacks downlink).

Figure 2:
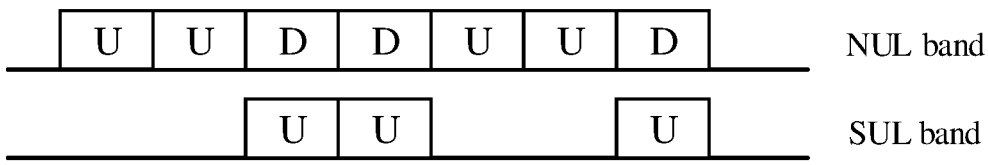
FIG. 2 is a schematic diagram of a time-division transmission on a SUL band and a NUL band according to an embodiment of the present disclosure.

In the use of SUL, SUL needs to work with the normal NR band in a time division manner in the uplink, i.e., transmissions on the two bands cannot be performed at the same time. As shown in FIG. 2, U is the available uplink transmit slot and D is the available downlink receiving slot. As can be seen from FIG. 2, transmissions on the SUL band and NR band will not be performed at the same time.

SAR indicator is sensitive to two factors, one is the magnitude of transmit power and the other is the transmit time. The existing solution to solve the SAR radiation of a terminal which exceeds a limit is usually to limit the terminal's transmit time. However, previously, the terminal only reported the maximum uplink duty cycle capability for a single frequency band, that is, when the uplink time percentage scheduled by the base station within a certain period of time is lower than the maximum uplink duty cycle capability, the terminal will not exceed the SAR radiation level requirement even when perform transmission at the maximum transmit power.

The existing solution is no longer applicable when the terminal operates under the combination of SUL band and NUL band. Taking SUL band A and NUL band B as an example, the existing solution is that the terminal reports the maximum uplink duty cycle capability (maxULdutycycle) for NUL band B. Thereafter, in the procedure when the base station schedules the terminal for transmission, the terminal counts the transmit time percentage of NUL band B in real time. When the actual percentage exceeds the maxULduty-cycle capability of NUL band B, the terminal performs a power level or power back-off. The problem is that this solution does not take into account the transmission on SUL band A. That is, when SUL band A also transmits signals, such transmission will actually bring an increase in external radiation of the terminal and accordingly cause SAR exceedance.

For SUL, a terminal needs to support a time division transmission on both SUL band and NR band, while the previous solution for SAR only considers the maximum uplink transmit time percentage when NR band works alone, which is not applicable to the terminal type supporting SUL band.

In view of the above problems, embodiments of the present disclosure propose a power control scheme that enables power control of terminal device to meet the radiation level requirements of SAR when the terminal device supports time-division transmission on SUL band and NUL band.

The technical solutions of present disclosure are detailed below through example embodiments.

Figure 3:
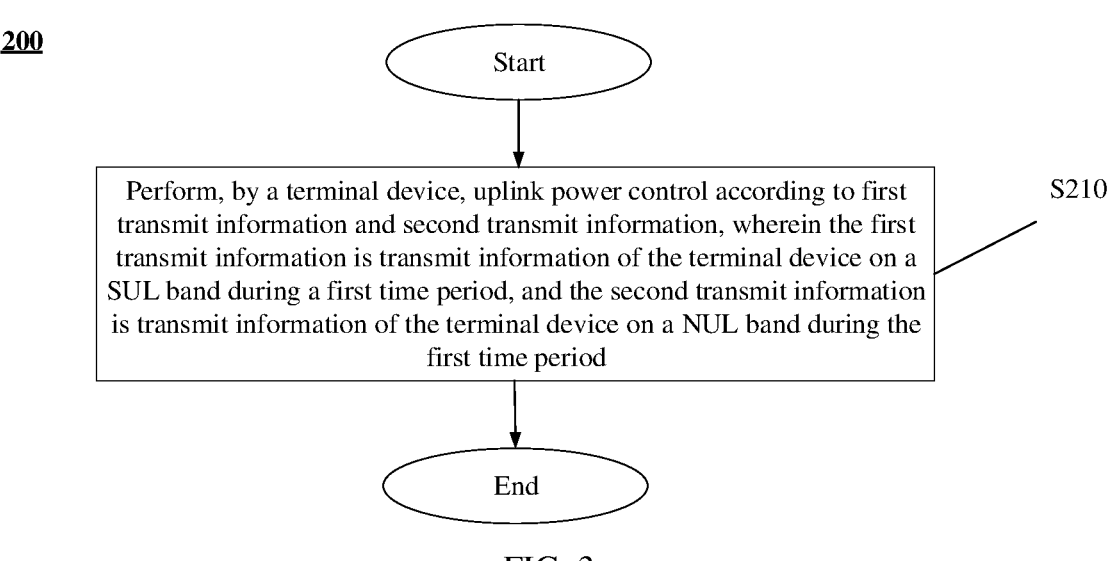
FIG. 3 is a schematic flow diagram of a power control method according to an embodiment of the present disclosure.

FIG. 3 is a schematic flow diagram of a power control method 200 according to an embodiment of the present disclosure. As shown in FIG. 3, the method 200 may include at least some of the following:

In S210, a terminal device performs uplink power control according to first transmit information and second transmit information. The first transmit information is transmit information of the terminal device on a SUL band during a first time period, and the second transmit information is transmit information of the terminal device on a NUL band during the first time period.

In an embodiment of the present disclosure, the terminal device uses the SUL band and NR band in a time-division transmission manner for uplink transmission, for example, as shown in FIG. 2.

It is noted that the uplink power control may be reducing the transmit power on the NUL band and/or the SUL band; or, the uplink power control may be determining that the terminal device can operate at the maximum transmit power on the NUL band and/or the SUL band; or, the uplink power control may be maintaining the current transmit power on the NUL band and/or the SUL band.

In an embodiment of the present disclosure, the purpose of the uplink power control is to avoid exceeding SAR limit. That is, an embodiment of the present disclosure can avoid exceeding SAR limit at high power terminals when the SUL band and NUL band operate simultaneously.

Optionally, the first time period is pre-configured or specified in a protocol; or, the first time period is configured by the network device; or, the first time period is determined by the terminal device based on its own implementation. In addition, the first time period may also be referred to as a first time window.

Optionally, in some embodiments, the first transmit information includes a percentage of uplink transmit time of the terminal device on the SUL band during the first time period, and the second transmit information includes a percentage of uplink transmit time of the terminal device on the NUL band during the first time period.

Optionally, if the first transmit information includes the percentage of uplink transmit time of the terminal device on the SUL band during the first time period, and the second transmit information includes the percentage of uplink transmit time of the terminal device on the NUL band during the first time period, the terminal device may perform uplink power control according to the schemes in Examples 1 to 7 below.

In Example 1, the terminal device performs uplink power control according to the first transmit information, the second transmit information, and a target maximum uplink duty cycle capability. The target maximum uplink duty cycle capability is a maximum uplink duty cycle capability of the terminal device on the SUL band, or the target maximum uplink duty cycle capability is a maximum uplink duty cycle capability of the terminal device on the NUL band.

Optionally, in Example 1, the terminal device performs uplink power control according to whether a first inequality holds.

The first inequality includes:

$$\frac{1}{2} * D_a + D_b \leq M_b, \text{ or, } \frac{1}{2} * D_a + D_b \leq M_a,$$

where $D_a$ denotes the first transmit information, $D_b$ denotes the second transmit information, $M_a$ denotes the maximum uplink duty cycle capability of the terminal device on the SUL band, and $M_b$ denotes the maximum uplink duty cycle capability of the terminal device on the NUL band.

For example, using the NUL band as a reference band, i.e., using the maximum uplink duty cycle capability of the terminal device on the NUL band as the reference value, the first inequality includes:

$$\frac{1}{2} * D_a + D_b \leq M_b.$$

As another example, using the SUL band as a reference band, i.e., using the maximum uplink duty cycle capability of the terminal device on the SUL band as the reference value, the first inequality includes:

$$\frac{1}{2} * D_a + D_b \leq M_a.$$

Optionally, in Example 1, in a case where the terminal device has a maximum transmit power of 26 dBm on the NUL band and the terminal device has a maximum transmit power of 23 dBm on the SUL band, the terminal device performs uplink power control according to whether the first inequality holds.

Alternatively, in a case where the terminal device has a maximum transmit power of 26 dBm on the NUL band and the terminal device has a maximum transmit power of 23 dBm on the SUL band and the difference in electromagnetic radiation between the SUL band and the NUL band is not considered, the terminal device performs uplink power control according to whether the first inequality holds.

Optionally, in Example 1, the terminal device reduces the transmit power on the NUL band and/or the SUL band in a case where the first inequality does not hold.

Further, in a case where the first inequality does not hold, the total power on the NUL band and the SUL band is less than a first power value.

Optionally, the network device is capable of operating at the maximum transmit power on the NUL band and/or the SUL band in a case where the first inequality holds.

In Example 2, the terminal device performs uplink power control according to the first transmit information, the second transmit information, a maximum uplink duty cycle capability of the terminal device on the SUL band and a maximum uplink duty cycle capability of the terminal device on the NUL band.

Optionally, a ratio of the maximum uplink duty cycle capability of the terminal device on the SUL band to the maximum uplink duty cycle capability of the terminal device on the NUL band may be a difference in electromagnetic radiation between the SUL band and the NUL band.

Optionally, in Example 2, the difference in electromagnetic radiation between the SUL band and the NUL band may be: a ratio of a maximum uplink duty cycle capability of the terminal device on the SUL band to a maximum uplink duty cycle capability of the terminal device on the NUL band.

Optionally, in Example 2, the terminal device performs uplink power control according to whether a second inequality holds.

The second inequality includes:

$$\frac{M_b}{M_a} * \frac{1}{2} * D_a + D_b \leq M_b, \text{ or,}$$

$$\frac{1}{2} * D_a + \frac{M_a}{M_b} * D_b \leq M_a,$$

where $D_a$ denotes the first transmit information, $D_b$ denotes the second transmit information, $M_a$ denotes the maximum uplink duty cycle capability of the terminal device on the SUL band, and $M_b$ denotes the maximum uplink duty cycle capability of the terminal device on the NUL band.

For example, using the NUL band as the reference band, i.e., using the maximum uplink duty cycle capability of the terminal device on the NUL band as the reference value, the second inequality includes:

$$\frac{M_b}{M_a} * \frac{1}{2} * D_a + D_b \le M_b.$$

As another example, using the SUL band as the reference band, i.e., using the maximum uplink duty cycle capability of the terminal device on the SUL band as the reference value, the second inequality includes:

$$\frac{1}{2} * D_a + \frac{M_a}{M_b} * D_b \le M_a.$$

Optionally, the terminal device performs uplink power control according to whether the second inequality holds in a case where the terminal device has a maximum transmit power of 26 dBm on the NUL band, the terminal device has a maximum transmit power of 23 dBm on the SUL band, and the target transmit power is 26 dBm.

Optionally, in Example 2, the target transmits power is 26 dBm.

Optionally, in example 2, in a case where the second inequality does not hold, the terminal device reduces the transmit power on the NUL band and/or the SUL band.

Further, in a case where the second inequality does not hold, the total power on the NUL band and the SUL band is less than the first power value.

Optionally, in a case where the second inequality holds, the network device is capable of operating at the maximum transmit power on the NUL band and/or the SUL band.

It is noted that the first inequality in Example 1 above may be evolved from the second inequality in Example 2 under a specific condition.

For example, the second inequality evolves into the first inequality when the difference in electromagnetic radiation between the SUL band and the NUL band is not considered in the second inequality.

In Example 3, the terminal device performs uplink power control according to the first transmit information, the second transmit information, the maximum uplink duty cycle capability of the terminal device on the SUL band, the maximum uplink duty cycle capability of the terminal device on the NUL band, a linear value of a maximum transmit power of the terminal device on the NUL band, and a linear value of a maximum transmit power of the terminal device on the SUL band.

Optionally, in Example 3, the terminal device performs uplink power control according to whether a third inequality holds.

The third inequality includes:

$$\frac{M_b}{M_a} * \frac{P_a}{P_o} * D_a + \frac{P_b}{P_o} * D_b \le M_b, \text{ or,}$$

$$\frac{P_a}{P_o} * D_a + \frac{M_a}{M_b} * \frac{P_b}{P_o} * D_b \le M_a,$$

where $D_a$ denotes the first transmit information, $D_b$ denotes the second transmit information, $M_a$ denotes the maximum uplink duty cycle capability of the terminal device on the SUL band, $M_b$ denotes the maximum uplink duty cycle capability of the terminal device on the NUL band, $P_a$ denotes the linear value of the maximum transmit power of the terminal device on the SUL band, $P_b$ denotes the linear value of the maximum transmit power of the terminal device on the NUL band, and $P_a$ denotes a linear value of a target transmit power.

For example, using the NUL band as the reference band, i.e., using the maximum uplink duty cycle capability of the terminal device on the NUL band as the reference value, the third inequality includes:

$$\frac{M_b}{M_a} * \frac{P_a}{P_o} * D_a + \frac{P_b}{P_o} * D_b \le M_b.$$

As another example, using the SUL band as the reference band, i.e., using the maximum uplink duty cycle capability of the terminal device on the SUL band as the reference value, the third inequality includes:

$$\frac{P_a}{P_o} * D_a + \frac{M_a}{M_b} * \frac{P_b}{P_o} * D_b \le M_a.$$

Optionally, in Example 3, the target transmit power is 26 dBm.

Optionally, in Example 3, in a case where the third inequality does not hold, the terminal device reduces the transmit power on the NUL band and/or the SUL band.

Further, in a case where the third inequality does not hold, the total power on the NUL band and the SUL band is less than the first power value.

Optionally, in a case where the third inequality holds, the network device is capable of operating at the maximum transmit power on the NUL band and/or the SUL band.

It is noted that $$\frac{M_a}{M_b}$$

denotes the difference in electromagnetic radiation between the SUL band and the NUL band, or, $$\frac{M_b}{M_a}$$

denotes the difference in electromagnetic radiation between the SUL band and the NUL band.

It is noted that the first inequality in Example 1 and the second inequality in Example 2 above may be evolved from the third inequality in Example 3 under a specific condition.

For example, the third inequality evolves to the second inequality in a case where the terminal device has a maximum transmit power of 26 dBm on the NUL band, the terminal device has a maximum transmit power of 23 dBm on the SUL band, and the target transmit power is 26 dBm.

As another example, the third inequality evolves to the first inequality in a case where the terminal device has a maximum transmit power of 26 dBm on the NUL band, the terminal device has a maximum transmit power of 23 dBm on the SUL band, the target transmit power is 26 dBm, and the difference in electromagnetic radiation between the SUL band and the NUL band is not considered.

In Example 4, the terminal device performs uplink power control according to the first transmit information, the second transmit information, a maximum uplink duty cycle capability of the terminal device on the SUL band, a maximum uplink duty cycle capability of the terminal device on the NUL band, a linear value of a maximum transmit power of the terminal device on the NUL band, and a linear value of a maximum transmit power of the terminal device on the SUL band.

Optionally, in Example 4, the terminal device performs uplink power control according to whether a fourth inequality holds.

The fourth inequality includes:

$$\frac{P_a}{P_o}*D_a+\frac{P_b}{P_o}*D_b \le \frac{\frac{P_a}{P_o}*D_a}{\frac{P_a}{P_o}*D_a+\frac{P_b}{P_o}*D_b}*M_a+\frac{\frac{P_b}{P_o}*D_b}{\frac{P_a}{P_o}*D_a+\frac{P_b}{P_o}*D_b}*M_b,$$

where $D_a$ denotes the first transmit information, $D_b$ denotes the second transmit information, $M_a$ denotes the maximum uplink duty cycle capability of the terminal device on the SUL band, $M_b$ denotes the maximum uplink duty cycle capability of the terminal device on the NUL band, $P_a$ denotes the linear value of the maximum transmit power of the terminal device on the SUL band, $P_b$ denotes the linear value of the maximum transmit power of the terminal device on the NUL band, and $P_o$ denotes a linear value of a target transmit power.

Optionally, the target transmit power is 23 dBm or 26 dBm.

Optionally, in Example 4, in a case where the fourth inequality does not hold, the terminal device reduces the transmit power on the NUL band and/or the SUL band.

Further, in a case where the fourth inequality does not hold, the total power on the NUL band and the SUL band is less than the first power value.

Optionally, in a case where the fourth inequality holds, the network device is capable of operating at maximum transmit power on the NUL band and/or the SUL band.

Optionally, in Example 4, when the target transmit power is 26 dBm, the terminal device has a maximum transmit power of 23 dBm on the SUL band, and the terminal device has a maximum transmit power of 23 dBm on that NUL band, the fourth inequality may be simplified as:

$$\frac{1}{2}*D_a+\frac{1}{2}*D_b \le \frac{D_a}{D_a+D_b}*M_a+\frac{D_b}{D_a+D_b}*M_b.$$

Optionally, in Example 4, when the target transmit power is 26 dBm, the terminal device has a maximum transmit power of 23 dBm on the SUL band, and the terminal device has a maximum transmit power of 26 dBm on that NUL band, the fourth inequality may be simplified as:

$$\frac{1}{2}*D_a+D_b \le \frac{\frac{1}{2}*D_a}{\frac{1}{2}*D_a+D_b}*M_a+\frac{D_b}{\frac{1}{2}*D_a+D_b}*M_b.$$

Optionally, in Example 4, when the target transmit power is 26 dBm, the maximum transmit power of the terminal device on the SUL band is 26 dBm, and the maximum transmit power of that terminal device on the NUL band is 23 dBm, the fourth inequality may be simplified as:

$$D_a+\frac{1}{2}*D_b \le \frac{D_a}{D_a+\frac{1}{2}*D_b}*M_a+\frac{\frac{1}{2}*D_b}{D_a+\frac{1}{2}*D_b}*M_b.$$

Optionally, in Example 4, when the target transmit power is 26 dBm, the maximum transmit power of the terminal device on the SUL band is 23 dBm, the maximum transmit power of the terminal device on the NUL band is 26 dBm, and it is assumed that when transmission on the SUL band is performed at 23 dBm, a 100% uplink transmission may be performed and SAR can be met, the corresponding $M_a$ is 50%, and the fourth inequality may be simplified as:

$$\frac{1}{2}*D_a+D_b \le \frac{\frac{1}{2}*D_a}{\frac{1}{2}*D_a+D_b}*\frac{1}{2}+\frac{D_b}{\frac{1}{2}*D_a+D_b}*M_b.$$

Optionally, in Example 4, when the target transmit power is 26 dBm, the maximum transmit power of the terminal device on the SUL band is 23 dBm, the maximum transmit power of the terminal device on the NUL band is 26 dBm, and it is assumed that when transmission on the SUL band is performed at 23 dBm, a 100% uplink transmission may be performed and SAR can be met, the corresponding $M_a$ is 50%; and it assumed that when transmission on the NUL band is performed at 26 dBm, a 50% uplink transmission may be performed and SAR can be met, the corresponding $M_b$ is 50%; and the fourth inequality may be simplified as:

$$\frac{1}{2}*D_a+D_b \le \frac{1}{2}.$$

Optionally, in Example 4, when the target transmit power is 23 dBm, the maximum transmit power of the terminal device on the SUL band is 23 dBm, and the maximum transmit power of the terminal device on the NUL band is 23 dBm, the fourth inequality may be simplified as:

$$D_a+D_b \le \frac{D_a}{D_a+D_b}*M_a+\frac{D_b}{D_a+D_b}*M_b.$$

Optionally, in Example 4, when the target transmit power is 23 dBm, the terminal device has a maximum transmit power of 26 dBm on the SUL band, and the terminal device has a maximum transmit power of 26 dBm on the NUL band, the fourth inequality may be simplified as:

$$2*D_a+2*D_b \le \frac{D_a}{D_a+D_b}*M_a+\frac{D_b}{D_a+D_b}*M_b.$$

Optionally, in Example 4, when the target transmit power is 23 dBm, the maximum transmit power of the terminal device on the SUL band is 23 dBm, and the maximum transmit power of the terminal device on the NUL band is 26 dBm, the fourth inequality may be simplified as $$D_a+2*D_b \le \frac{D_a}{D_a+2*D_b}*M_a+\frac{2*D_b}{D_a+2*D_b}*M_b.$$

Optionally, in Example 4, when the target transmit power is 23 dBm, the terminal device has a maximum transmit power of 26 dBm on the SUL band, and the terminal device has a maximum transmit power of 23 dBm on the NUL band, the fourth inequality may be simplified as:

$$2*D_a + D_b \leq \frac{2*D_a}{2*D_a + D_b} * M_a + \frac{D_b}{2*D_a + D_b} * M_b.$$

Optionally, in Example 4, when the target transmit power is 23 dBm, the maximum transmit power of the terminal device on the SUL band is 23 dBm, the maximum transmit power of the terminal device on the NUL band is 26 dBm, and it is assumed that when transmission on the SUL band is performed at 23 dBm, a 100% uplink transmission may be performed and SAR can be met, the corresponding $M_a$ is 100%, the fourth inequality may be simplified as:

$$D_a + 2*D_b \leq \frac{D_a}{D_a + 2*D_b} + \frac{2*D_b}{D_a + 2*D_b} * M_b.$$

Optionally, in Example 4, when the target transmit power is 23 dBm, the maximum transmit power of the terminal device on the SUL band is 23 dBm, the maximum transmit power of the terminal device on the NUL band is 26 dBm, and it is assumed that when transmission on the SUL band is performed at 23 dBm, a 100% uplink transmission may be performed and SAR can be met, the corresponding $M_a$ is 100%; and it is assumed that when transmission on the NUL band is performed at 23 dBm, a 100% uplink transmission may be performed and SAR can be met, then the corresponding $M_b$ is 100%, and the fourth inequality may be simplified as $$D_a+2*D_b \leq 1.$$

In Example 5, the terminal device performs uplink power control according to whether a fifth inequality holds.

The fifth inequality includes:

$$\frac{1}{2}*D_a + D_b \leq \frac{1}{2},$$

where $D_a$ denotes the first transmit information and $D_b$ denotes the second transmit information.

Optionally, in Example 5, the terminal device performs uplink power control according to whether the fifth inequality holds in a case where the terminal device has a maximum transmit power of 26 dBm on the NUL band, the terminal device has a maximum transmit power of 23 dBm on the SUL band, the electromagnetic wave Specific Absorption Rate (SAR) is met when a 100% uplink transmission is performed on the SUL band with a power of 23 dBm, and the SAR is met when a 50% uplink transmission is performed on the NUL band with a power of 26 dBm.

Optionally, in Example 5, in a case where the fifth inequality does not hold, the network device reduces the transmit power on the NUL band and/or the SUL band.

Further, in a case where the fifth inequality does not hold, the total power on the NUL band and the SUL band is less than the first power value.

Optionally, in a case where the fifth inequality holds, the network device is capable of operating at maximum transmit power on the NUL band and/or the SUL band.

It is noted that the fifth inequality in Example 5 may be a simplification of the fourth inequality in Example 4 above when the following condition is met:

The target transmit power is 26 dBm, the terminal device has a maximum transmit power of 23 dBm on the SUL band, the terminal device has a maximum transmit power of 26 dBm on the NUL band, and it is assumed that when transmission on the SUL band is performed at 23 dBm, a 100% uplink transmission may be performed and SAR can be met, the corresponding $M_a$ is 50%; it is assumed that when transmission on the NUL band is performed at 26 dBm, a 50% uplink transmission may be performed and SAR can be met, the corresponding $M_b$ is 50%.

In Example 6, the terminal device performs uplink power control according to the first transmit information, the second transmit information, a maximum uplink duty cycle capability of the terminal device for transmission at 23 dBm on the SUL band, and a maximum uplink duty cycle capability of the terminal device for transmission at 26 dBm on the NUL band.

Optionally, in Example 6, the terminal device performs uplink power control according to whether a sixth inequality holds.

The sixth inequality includes:

$$\frac{1}{2}*D_a + D_b \leq \frac{\frac{1}{2}*D_a}{\frac{1}{2}*D_a + D_b} * M_a + \frac{D_b}{\frac{1}{2}*D_a + D_b} * M_b,$$

where $D_a$ denotes the first transmit information, $D_b$ denotes the second transmit information, $M_a$ denotes the maximum uplink duty cycle capability of the terminal device for transmission at 23 dBm on the SUL band, and $M_b$ denotes the maximum uplink duty cycle capability of the terminal device for transmission at 26 dBm on the NUL band.

Optionally, in Example 6, the terminal device performs uplink power control according to whether the sixth inequality holds in a case where the terminal device has a maximum transmit power of 26 dBm on the NUL band, the terminal device has a maximum transmit power of 23 dBm on the SUL band, and an electromagnetic wave Specific Absorption Rate (SAR) is met when a 100% uplink transmission is performed on the SUL band with a power of 23 dBm.

Optionally, in Example 6, the network device reduces the transmit power on the NUL band and/or the SUL band in a case where the sixth inequality does not hold.

Further, in a case where the sixth inequality does not hold, the total power on the NUL band and the SUL band is less than the first power value.

Optionally, in a case where the sixth inequality holds, the network device is capable of operating at maximum transmit power on the NUL band and/or the SUL band.

It is noted that the sixth inequality in Example 6 may be a simplification of the fourth inequality in Example 4 above when the following condition is met:

The target transmit power is 26 dBm, the terminal device has a maximum transmit power of 23 dBm on the SUL band, and the terminal device has a maximum transmit power of 26 dBm on the NUL band.

In Example 7, the terminal device performs uplink power control according to the first transmit information, the second transmit information, a maximum uplink duty cycle capability of the terminal device for transmission at a first transmit power on the SUL band, a maximum uplink duty cycle capability of the terminal device for transmission at a second transmit power on the NUL band, a linear value of a maximum transmit power of the terminal device on the NUL band, and a linear value of a maximum transmit power of the terminal device on the SUL band.

Optionally, in Example 7, the terminal device performs uplink power control according to whether a seventh inequality holds.

The seventh inequality includes:

$$\frac{1}{2} * \frac{P_a}{P_1} * D_a + \frac{P_b}{P_2} * D_b \leq \frac{\frac{1}{2} * D_a}{\frac{1}{2} * D_a + D_b} * \frac{1}{2} * M_b + \frac{D_b}{\frac{1}{2} * D_a + D_b} * M_b,$$

where $D_a$ denotes the first transmit information, $D_b$ denotes the second transmit information, $M_a$ denotes the maximum uplink duty cycle capability of the terminal device for transmission at the first transmit power on the SUL band, $M_b$ denotes the maximum uplink duty cycle capability of the terminal device for transmission at the second transmit power on the NUL band, $P_a$ denotes the linear value of the maximum transmit power of the terminal device on the NUL band, $P_b$ denotes the linear value of the maximum transmit power of the terminal device on the SUL band, $P_1$ denotes the linear value of the first transmit power, and $P_2$ denotes the linear value of the second transmit power.

Optionally, in Example 7, in a case where the seventh inequality does not hold, the network device reduces the transmit power on the NUL band and/or the SUL band.

Further, in a case where the seventh inequality does not hold, the total power on the NUL band and the SUL band is less than the first power value.

Optionally, in a case where the seventh inequality holds, the network device is capable of operating at maximum transmit power on the NUL band and/or the SUL band.

Optionally, in Example 7, the first transmit power is 23 dBm and the second transmit power is 26 dBm.

Optionally, in Example 7, when the first transmit power is 23 dBm, the second transmit power is 26 dBm, the terminal device has a maximum transmit power of 23 dBm on the SUL band, and the terminal device has a maximum transmit power of 23 dBm on the NUL band, the seventh inequality may be simplified as:

$$\frac{1}{2} * D_a + \frac{1}{2} * D_b \leq \frac{D_a}{D_a + D_b} * \frac{1}{2} * M_a + \frac{D_b}{D_a + D_b} * M_b.$$

Optionally, in Example 7, when the first transmit power is 23 dBm, the second transmit power is 26 dBm, the maximum transmit power of the terminal device on the SUL band is 26 dBm and the maximum transmit power of the terminal device on the NUL band is 26 dBm, the seventh inequality may be simplified as:

$$D_a + D_b \leq \frac{D_a}{D_a + D_b} * \frac{1}{2} * M_a + \frac{D_b}{D_a + D_b} * M_b.$$

Optionally, in Example 7, when the first transmit power is 23 dBm, the second transmit power is 26 dBm, the terminal device has a maximum transmit power of 23 dBm on the SUL band, and the terminal device has a maximum transmit power of 26 dBm on the NUL band, the seventh inequality may be simplified as:

$$\frac{1}{2} * D_a + D_b \leq \frac{\frac{1}{2} * D_a}{\frac{1}{2} * D_a + D_b} * \frac{1}{2} * M_a + \frac{D_b}{\frac{1}{2} * D_a + D_b} * M_b.$$

Optionally, in Example 7, when the first transmit power is 23 dBm, the second transmit power is 26 dBm, the terminal device has a maximum transmit power of 26 dBm on the SUL band, and the terminal device has a maximum transmit power of 23 dBm on the NUL band, the seventh inequality may be simplified as $$D_a + \frac{1}{2} * D_b \leq \frac{D_a}{D_a + \frac{1}{2} * D_b} * \frac{1}{2} * M_a + \frac{\frac{1}{2} * D_b}{D_a + \frac{1}{2} * D_b} * M_b.$$

Optionally, in Example 7, when the first transmit power is 23 dBm, the second transmit power is 26 dBm, the terminal device has a maximum transmit power of 23 dBm on the SUL band, the terminal device has a maximum transmit power of 26 dBm on the NUL band, and it is assumed that when transmission on the SUL band is performed at 23 dBm, a 100% uplink transmission may be performed and SAR can be met, the corresponding $M_a$ is 100%, the seventh inequality may be simplified as:

$$\frac{1}{2} * D_a + D_b \leq \frac{\frac{1}{2} * D_a}{\frac{1}{2} * D_a + D_b} * \frac{1}{2} + \frac{D_b}{\frac{1}{2} * D_a + D_b} * M_b.$$

Optionally, in Example 7, when the first transmit power is 23 dBm, the second transmit power is 26 dBm, the terminal device has a maximum transmit power of 23 dBm on the SUL band, the terminal device has a maximum transmit power of 26 dBm on the NUL band, it is assumed that when transmission on the SUL band is performed at 23 dBm, a 100% uplink transmission may be performed and SAR can be met, and it is assumed that when transmission on the NUL band is performed at 26 dBm, a 50% uplink transmission may be performed and SAR can be met, the corresponding $M_a$ is 100%, and the corresponding $M_b$ is 50%, the seventh inequality may be simplified as $$\frac{1}{2} * D_a + D_b \leq \frac{\frac{1}{2} * D_a}{\frac{1}{2} * D_a + D_b} * \frac{1}{2} + \frac{D_b}{\frac{1}{2} * D_a + D_b} * \frac{1}{2}.$$

Optionally, in Examples 1 to 7 above, the first power value is pre-configured or is specified by a protocol; or, the first power value is configured by the network device. For example, the first power value is 23 dBm, or the first power value is energy class (power class) 3.

It is noted that in the above examples, $M_a$ is the maximum uplink duty cycle capability of the terminal device when operating at a high power (transmit power greater than 23 dBm, for example 26 dBm) on the SUL band, and $M_b$ is the maximum uplink duty cycle capability of the terminal device when operating at a high power (transmit power greater than 23 dBm, for example 26 dBm) on the NUL band.

Optionally, the terminal device may report Ma and Mb to the network device, so that the network device may also perform uplink power control for the terminal device based on the schemes in Examples 1 to 7 above.

Optionally, if the terminal device does not report Ma and Mb to the network device, the network device may take a default value of 50% for Ma and a default value of 50% for Mb when performing uplink power control for that terminal device based on the schemes in Examples 1 to 7 above.

It should be noted that for a frequency band that cannot perform transmission to 26 dBm (such as the SUL band), it can be approximated by a situation where the SAR can be met by the terminal at 23 dBm.

For example, if the terminal can meet SAR with a 100% transmit time percentage at 23 dBm, then its maximum uplink time percentage capability at 26 dBm may be approximated as 50%.

Another example, if the terminal can meet SAR with a 80% transmit time percentage at 23 dBm, then its maximum uplink time percentage capability at 26 dBm may be approximated as 40%.

It is also noted that the linear value of the transmit power 23 dBm is approximated as 200 mW and the linear value of the transmit power 26 dBm is approximated as 400 mW.

Optionally, in some embodiments, the first transmit information includes the transmit power and transmit time of the terminal device on the NUL band during the first time period, and the second transmit information includes the transmit power and transmit time of the terminal device on the SUL band during the first time period.

Optionally, in a case where the first transmit information includes the transmit power and transmit time of the terminal device on the NUL band during the first time period, and the second transmit information includes the transmit power and transmit time of the terminal device on the SUL band during the first time period, S210 may specifically be as follows:

the terminal device determines an energy accumulative value during the first time period according to the first transmit information and the second transmit information; and in a case where the energy accumulative value is greater than a first threshold value, the terminal device reduces a transmit power on the NUL band and/or the SUL band.

Optionally, in a case where the energy accumulative value is greater than the first threshold value, the total power on the NUL band and the SUL band is less than the first power value.

Optionally, the terminal device is capable of operating at the maximum transmit power on the NUL band and/or the SUL band if the energy accumulative value is greater than the first threshold value.

Optionally, the terminal device determines the energy accumulative value during the first time period according to Equation 1 as follows:

$$\sum_{i=1}^{N} (p_i * T_i) \qquad \text{Equation 1}$$

where i denotes an i-th transmission of the terminal device during the first time period, N is a total number of transmissions of the terminal device during the first time period, $P_i$ denotes an average power of the i-th transmission, and $T_i$ denotes a length of time of the i-th transmission.

Optionally, the first threshold value is an accumulative energy threshold value not exceeding an electromagnetic wave Specific Absorption Rate (SAR) indicator during the first time period.

Optionally, the first threshold value is pre-configured or specified by a protocol, or the first threshold value is configured by a network device, or the first threshold value is determined by the terminal device.

Optionally, if the first threshold value is determined by the terminal device, the terminal device reports the first threshold value.

Optionally, in a case where the energy accumulative value is greater than the first threshold value, the terminal device sends first indication information. The first indication information is used to indicate that a power back-off has occurred in the NUL band and/or the SUL band.

Optionally, the first indication information includes a power back-off value for the NUL band and/or the SUL band.

Thus, in embodiments of the present disclosure, the terminal device can determine an inequality relationship between the SUL band and the NUL band based on the actually scheduled uplink time percentages of the SUL band and the NUL band, thereby ensuring that the total electromagnetic radiation of the terminal in the SUL band as well as the NR band does not exceed the limit. In addition, in embodiments of the present disclosure, by introducing the actual transmit power and transmit time, the actual situation of terminal SAR and the remaining available energy can be determined more accurately and thus the determined situation can be more closely to the actual situation.

The terminal-side embodiments of the present disclosure are described in detail above in conjunction with FIG. 3, and the network-side embodiments of the present disclosure will be described in detail below in conjunction with FIG. 4. It should be understood that the network-side embodiments and the terminal-side embodiments correspond to each other, and for similar descriptions, reference can be made to the previous method embodiments.

FIG. 4 is a schematic flowchart of another power control method 300 according to an embodiment of the present disclosure. As shown in FIG. 4, the method 300 may include at least some of the following:

In 3210, a network device performs uplink power control according to first transmit information and second transmit information. The first transmit information is transmit information of a terminal device on a SUL band during a first time period, and the second transmit information is transmit information of the terminal device on a NUL band during the first time period.

In an embodiment of the present disclosure, the terminal device uses the SUL band and NR band in a time-division transmission manner for uplink transmission, for example, as shown in FIG. 2.

It is noted that the uplink power control may be reducing the transmit power on the NUL band and/or the SUL band; or, the uplink power control may be performing control to enable operation at the maximum transmit power on the NUL band and/or the SUL band; or, the uplink power control may be maintaining the current transmit power on the NUL band and/or the SUL band.

In an embodiment of the present disclosure, the purpose of the uplink power control is to avoid SAR exceedance.

That is, an embodiment of the present disclosure can avoid SAR exceeding a limit at high power terminals when the SUL band and NUL band operate simultaneously.

Optionally, the first time period is pre-configured or specified in a protocol; or, the first time period is configured by the network device; or, the first time period is determined by the terminal device based on its own implementation. In addition, the first time period may also be referred to as a first time window.

Optionally, if the first transmit information includes the percentage of uplink transmit time of the terminal device on the SUL band during the first time period, and the second transmit information includes the percentage of uplink transmit time of the terminal device on the NUL band during the first time period, the network device may perform uplink power control for the terminal device according to the schemes in Examples 1 to 7 below.

It should be noted that the parameters in Examples 1 to 7 may be reported by the terminal device; or the parameters in Examples 1 to 7 are partially reported by the terminal device and partially obtained directly by the network device; or, the parameters in Examples 1 to 7 are partially reported by the terminal device and partially pre-configured or specified by a protocol.

In Example 1, the network device performs uplink power control according to the first transmit information, the second transmit information, and a target maximum uplink duty cycle capability. The target maximum uplink duty cycle capability is a maximum uplink duty cycle capability of the terminal device on the SUL band, or the target maximum uplink duty cycle capability is a maximum uplink duty cycle capability of the terminal device on the NUL band.

Optionally, in Example 1, the network device performs uplink power control according to whether a first inequality holds.

The first inequality includes:

$$\frac{1}{2}*D_a + D_b \le M_b, \text{ or, } \frac{1}{2}*D_a + D_b \le M_a,$$

where $D_a$ denotes the first transmit information, $D_b$ denotes the second transmit information, $M_a$ denotes the maximum uplink duty cycle capability of the terminal device on the SUL band, and $M_b$ denotes the maximum uplink duty cycle capability of the terminal device on the NUL band.

For example, using the NUL band as a reference band, i.e., using the maximum uplink duty cycle capability of the terminal device on the NUL band as the reference value, the first inequality includes:

$$\frac{1}{2}*D_a + D_b \le M_b.$$

As another example, using the SUL band as a reference band, i.e., using the maximum uplink duty cycle capability of the terminal device on the SUL band as the reference value, the first inequality includes:

$$\frac{1}{2}*D_a + D_b \le M_a.$$

Optionally, in Example 1, in a case where the terminal device has a maximum transmit power of 26 dBm on the NUL band, the terminal device has a maximum transmit power of 23 dBm on the SUL band and the target transmit power is 26 dBm, the network device performs uplink power control according to whether the first inequality holds.

Alternatively, in a case where the terminal device has a maximum transmit power of 26 dBm on the NUL band, the terminal device has a maximum transmit power of 23 dBm on the SUL band, the target transmit power is 26 dBm and the difference in electromagnetic radiation between the SUL band and the NUL band is not considered, the network device performs uplink power control according to whether the first inequality holds.

Optionally, in Example 1, the network device reduces the transmit power on the NUL band and/or the SUL band in a case where the first inequality does not hold.

Further, in a case where the first inequality does not hold, the total power on the NUL band and the SUL band is less than a first power value.

Optionally, the network device is capable of operating at the maximum transmit power on the NUL band and/or the SUL band in a case where the first inequality holds.

In Example 2, the network device performs uplink power control according to the first transmit information, the second transmit information, a maximum uplink duty cycle capability of the terminal device on the SUL band and a maximum uplink duty cycle capability of the terminal device on the NUL band.

Optionally, a ratio of the maximum uplink duty cycle capability of the terminal device on the SUL band to the maximum uplink duty cycle capability of the terminal device on the NUL band may be a difference in electromagnetic radiation between the SUL band and the NUL band.

Optionally, in Example 2, the network device performs uplink power control according to whether a second inequality holds.

The second inequality includes:

$$\frac{M_b}{M_a}*\frac{1}{2}*D_a + D_b \le M_b, \text{ or, } \frac{1}{2}*D_a + \frac{M_a}{M_b}*D_b \le M_a,$$

where $D_a$ denotes the first transmit information, $D_b$ denotes the second transmit information, $M_a$ denotes the maximum uplink duty cycle capability of the terminal device on the SUL band, and $M_b$ denotes the maximum uplink duty cycle capability of the terminal device on the NUL band.

For example, using the NUL band as the reference band, i.e., using the maximum uplink duty cycle capability of the terminal device for transmission at 26 dBm on the NUL band as the reference value, the second inequality includes:

$$\frac{M_b}{M_a}*\frac{1}{2}*D_a + D_b \le M_b.$$

As another example, using the SUL band as the reference band, i.e., using the maximum uplink duty cycle capability of the terminal device for transmission at 26 dBm on the SUL band as the reference value, the second inequality includes:

$$\frac{1}{2}*D_a + \frac{M_a}{M_b}*D_b \le M_a.$$

23

Optionally, the network device performs uplink power control according to whether the second inequality holds in a case where the terminal device has a maximum transmit power of 26 dBm on the NUL band, and the terminal device has a maximum transmit power of 23 dBm on the SUL band.

Optionally, in Example 2, the target transmits power is 26 dBm.

Optionally, in example 2, in a case where the second inequality does not hold, the network device reduces the transmit power on the NUL band and/or the SUL band.

Further, in a case where the second inequality does not hold, the total power on the NUL band and the SUL band is less than the first power value.

Optionally, in a case where the second inequality holds, the network device is capable of operating at the maximum transmit power on the NUL band and/or the SUL band.

It is noted that the first inequality in Example 1 above may be evolved from the second inequality in Example 2 under a specific condition.

For example, the second inequality evolves into the first inequality when the difference in electromagnetic radiation between the SUL band and the NUL band is not considered in the second inequality.

In Example 3, the network device performs uplink power control according to the first transmit information, the second transmit information, the difference in electromagnetic radiation between the SUL band and the NUL band, the maximum uplink duty cycle capability of the terminal device on the SUL band, the maximum uplink duty cycle capability of the terminal device on the NUL band, and a linear value of a maximum transmit power of the terminal device on the SUL band.

Optionally, in Example 3, the network device performs uplink power control according to whether a third inequality holds.

The third inequality includes:

$$\frac{M_b}{M_a} * \frac{P_a}{P_o} * D_a + \frac{P_b}{P_o} * D_b \le M_b, \text{ or, } \frac{P_a}{P_o} * D_a + \frac{M_a}{M_b} * \frac{P_b}{P_o} * D_b \le M_a,$$

where $D_a$ denotes the first transmit information, $D_b$ denotes the second transmit information, $M_a$ denotes the maximum uplink duty cycle capability of the terminal device on the SUL band, $M_b$ denotes the maximum uplink duty cycle capability of the terminal device on the NUL band, $P_a$ denotes the linear value of the maximum transmit power of the terminal device on the SUL band, $P_b$ denotes the linear value of the maximum transmit power of the terminal device on the NUL band, and $P_o$ denotes a linear value of a target transmit power.

It is noted that $$\frac{M_a}{M_b}$$

denotes the difference in electromagnetic radiation between the SUL band and the NUL band, or, $$\frac{M_b}{M_a}$$

24 denotes the difference in electromagnetic radiation between the SUL band and the NUL band.

For example, using the NUL band as the reference band, i.e., using the maximum uplink duty cycle capability of the terminal device for the transmission at 26 dBm on the NUL band as the reference value, the third inequality includes:

$$\frac{M_b}{M_a} * \frac{P_a}{P_o} * D_a + \frac{P_b}{P_o} * D_b \le M_b.$$

As another example, using the SUL band as the reference band, i.e., using the maximum uplink duty cycle capability of the terminal device for the transmission at 26 dBm on the SUL band as the reference value, the third inequality includes:

$$\frac{P_a}{P_o} * D_a + \frac{M_a}{M_b} * \frac{P_b}{P_o} * D_b \le M_a.$$

Optionally, in Example 3, the target transmit power is 26 dBm.

Optionally, in Example 3, in a case where the third inequality does not hold, the network device reduces the transmit power on the NUL band and/or the SUL band.

Further, in a case where the third inequality does not hold, the total power on the NUL band and the SUL band is less than the first power value.

Optionally, in a case where the third inequality holds, the network device is capable of operating at the maximum transmit power on the NUL band and/or the SUL band.

It is noted that the first inequality in Example 1 and the second inequality in Example 2 above may be evolved from the third inequality in Example 3 under a specific condition.

For example, the third inequality evolves to the second inequality in a case where the terminal device has a maximum transmit power of 26 dBm on the NUL band, the terminal device has a maximum transmit power of 23 dBm on the SUL band, and the target transmit power is 26 dBm.

As another example, the third inequality evolves to the first inequality in a case where the terminal device has a maximum transmit power of 26 dBm on the NUL band, the terminal device has a maximum transmit power of 23 dBm on the SUL band, the target transmit power is 26 dBm, and the difference in electromagnetic radiation between the SUL band and the NUL band is not considered.

In Example 4, the network device performs uplink power control according to the first transmit information, the second transmit information, a maximum uplink duty cycle capability of the terminal device on the SUL band, a maximum uplink duty cycle capability of the terminal device on the NUL band, a linear value of a maximum transmit power of the terminal device on the NUL band, and a linear value of a maximum transmit power of the terminal device on the SUL band.

Optionally, in Example 4, the network device performs uplink power control according to whether a fourth inequality holds.

The fourth inequality includes:

$$\frac{P_a}{P_o} * D_a + \frac{P_b}{P_o} * D_b \le \frac{\frac{P_a}{P_o} * D_a}{\frac{P_a}{P_o} * D_a + \frac{P_b}{P_o} * D_b} * M_a + \frac{\frac{P_b}{P_o} * D_b}{\frac{P_a}{P_o} * D_a + \frac{P_b}{P_o} * D_b} * M_b,$$

where $D_a$ denotes the first transmit information, $D_b$ denotes the second transmit information, $M_a$ denotes the maximum uplink duty cycle capability of the terminal device on the SUL band, $M_b$ denotes the maximum uplink duty cycle capability of the terminal device on the NUL band, $P_a$ denotes the linear value of the maximum transmit power of the terminal device on the SUL band, $P_b$ denotes the linear value of the maximum transmit power of the terminal device on the NUL band, and $P_o$ denotes a linear value of a target transmit power.

Optionally, the target transmit power is 23 dBm or 26 dBm.

Optionally, in Example 4, in a case where the fourth inequality does not hold, the network device reduces the transmit power on the NUL band and/or the SUL band.

Further, in a case where the fourth inequality does not hold, the total power on the NUL band and the SUL band is less than the first power value.

Optionally, in a case where the fourth inequality holds, the network device is capable of operating at maximum transmit power on the NUL band and/or the SUL band.

Optionally, in Example 4, when the target transmit power is 26 dBm, the terminal device has a maximum transmit power of 23 dBm on the SUL band, and the terminal device has a maximum transmit power of 23 dBm on that NUL band, the fourth inequality may be simplified as:

$$\frac{1}{2} * D_a + \frac{1}{2} * D_b \leq \frac{D_a}{D_a + D_b} * M_a + \frac{D_b}{D_a + D_b} * M_b.$$

Optionally, in Example 4, when the target transmit power is 26 dBm, the terminal device has a maximum transmit power of 23 dBm on the SUL band, and the terminal device has a maximum transmit power of 26 dBm on that NUL band, the fourth inequality may be simplified as:

$$\frac{1}{2} * D_a + D_b \leq \frac{\frac{1}{2} * D_a}{\frac{1}{2} * D_a + D_b} * M_a + \frac{D_b}{\frac{1}{2} * D_a + D_b} * M_b.$$

Optionally, in Example 4, when the target transmit power is 26 dBm, the maximum transmit power of the terminal device on the SUL band is 26 dBm, and the maximum transmit power of that terminal device on the NUL band is 23 dBm, the fourth inequality may be simplified as:

$$D_a + \frac{1}{2} * D_b \leq \frac{D_a}{D_a + \frac{1}{2} * D_b} * M_a + \frac{\frac{1}{2} * D_b}{D_a + \frac{1}{2} * D_b} * M_b.$$

Optionally, in Example 4, when the target transmit power is 26 dBm, the maximum transmit power of the terminal device on the SUL band is 23 dBm, the maximum transmit power of the terminal device on the NUL band is 26 dBm, and it is assumed that when transmission on the SUL band is performed at 23 dBm, a 100% uplink transmission may be performed and SAR can be met, the corresponding $M_a$ is 50%, and the fourth inequality may be simplified as:

$$\frac{1}{2} * D_a + D_b \leq \frac{\frac{1}{2} * D_a}{\frac{1}{2} * D_a + D_b} * \frac{1}{2} + \frac{D_b}{\frac{1}{2} * D_a + D_b} * M_b.$$

Optionally, in Example 4, when the target transmit power is 26 dBm, the maximum transmit power of the terminal device on the SUL band is 23 dBm, the maximum transmit power of the terminal device on the NUL band is 26 dBm, and it is assumed that when transmission on the SUL band is performed at 23 dBm, a 100% uplink transmission may be performed and SAR can be met, the corresponding $M_a$ is 50%; and it is assumed that when transmission on the NUL band is performed at 26 dBm, a 50% uplink transmission may be performed and SAR can be met, the corresponding Mb is 50%; and the fourth inequality may be simplified as:

$$\frac{1}{2} * D_a + D_b \leq \frac{1}{2}.$$

Optionally, in Example 4, when the target transmit power is 23 dBm, the maximum transmit power of the terminal device on the SUL band is 23 dBm, and the maximum transmit power of the terminal device on the NUL band is 23 dBm, the fourth inequality may be simplified as:

$$D_a + D_b \leq \frac{D_a}{D_a + D_b} * M_a + \frac{D_b}{D_a + D_b} * M_b.$$

Optionally, in Example 4, when the target transmit power is 23 dBm, the terminal device has a maximum transmit power of 26 dBm on the SUL band, and the terminal device has a maximum transmit power of 26 dBm on the NUL band, the fourth inequality may be simplified as:

$$2 * D_a + 2 * D_b \leq \frac{D_a}{D_a + D_b} * M_a + \frac{D_b}{D_a + D_b} * M_b.$$

Optionally, in Example 4, when the target transmit power is 23 dBm, the maximum transmit power of the terminal device on the SUL band is 23 dBm, and the maximum transmit power of the terminal device on the NUL band is 26 dBm, the fourth inequality may be simplified as $$D_a + 2 * D_b \leq \frac{D_a}{D_a + 2 * D_b} * M_a + \frac{2 * D_b}{D_a + 2 * D_b} * M_b.$$

Optionally, in Example 4, when the target transmit power is 23 dBm, the terminal device has a maximum transmit power of 26 dBm on the SUL band, and the terminal device has a maximum transmit power of 23 dBm on the NUL band, the fourth inequality may be simplified as:

$$2 * D_a + D_b \leq \frac{2 * D_a}{2 * D_a + D_b} * M_a + \frac{D_b}{2 * D_a + D_b} * M_b.$$

Optionally, in Example 4, when the target transmit power is 23 dBm, the maximum transmit power of the terminal device on the SUL band is 23 dBm, the maximum transmit power of the terminal device on the NUL band is 26 dBm, and it is assumed that when transmission on the SUL band is performed at 23 dBm, a 100% uplink transmission may be performed and SAR can be met, the corresponding $M_a$ is 100%, the fourth inequality may be simplified as:

$$D_a + 2*D_b \le \frac{D_a}{D_a+2*D_b} + \frac{2*D_b}{D_a+2*D_b}*M_b.$$

Optionally, in Example 4, when the target transmit power is 23 dBm, the maximum transmit power of the terminal device on the SUL band is 23 dBm, the maximum transmit power of the terminal device on the NUL band is 26 dBm, and it is assumed that when transmission on the SUL band is performed at 23 dBm, a 100% uplink transmission may be performed and SAR can be met, the corresponding $M_a$ is 100%; and it is assumed that when transmission on the NUL band is performed at 23 dBm, a 100% uplink transmission may be performed and SAR can be met, then the corresponding $M_b$ is 100%, and the fourth inequality may be simplified as:

$$D_a + 2*D_b \le 1.$$

In Example 5, the network device performs uplink power control according to whether a fifth inequality holds.

The fifth inequality includes:

$$\frac{1}{2}*D_a + D_b \le \frac{1}{2},$$

where $D_a$ denotes the first transmit information and $D_b$ denotes the second transmit information.

Optionally, in Example 5, the network device performs uplink power control according to whether the fifth inequality holds in a case where the terminal device has a maximum transmit power of 26 dBm on the NUL band, the terminal device has a maximum transmit power of 23 dBm on the SUL band, the electromagnetic wave Specific Absorption Rate (SAR) is met when a 100% uplink transmission is performed on the SUL band with a power of 23 dBm, and the SAR is met when a 50% uplink transmission is performed on the NUL band with a power of 26 dBm.

Optionally, in Example 5, in a case where the fifth inequality does not hold, the network device reduces the transmit power on the NUL band and/or the SUL band.

Further, in a case where the fifth inequality does not hold, the total power on the NUL band and the SUL band is less than the first power value.

Optionally, in a case where the fifth inequality holds, the network device is capable of operating at maximum transmit power on the NUL band and/or the SUL band.

It is noted that the fifth inequality in Example 5 may be a simplification of the fourth inequality in Example 4 above when the following condition is met:

The target transmit power is 26 dBm, the terminal device has a maximum transmit power of 23 dBm on the SUL band, the terminal device has a maximum transmit power of 26 dBm on the NUL band, and it is assumed that when transmission on the SUL band is performed at 23 dBm, a 100% uplink transmission may be performed and SAR can be met, the corresponding $M_a$ is 50%; it is assumed that when transmission on the NUL band is performed at 26 dBm, a 50% uplink transmission may be performed and SAR can be met, the corresponding $M_b$ is 50%.

In Example 6, the network device performs uplink power control according to the first transmit information, the second transmit information, a maximum uplink duty cycle capability of the terminal device for transmission at 23 dBm on the SUL band, and a maximum uplink duty cycle capability of the terminal device for transmission at 26 dBm on the NUL band.

Optionally, in Example 6, the network device performs uplink power control according to whether a sixth inequality holds.

The sixth inequality includes:

$$\frac{1}{2}*D_a + D_b \le \frac{\frac{1}{2}*D_a}{\frac{1}{2}*D_a+D_b}*M_a + \frac{D_b}{\frac{1}{2}*D_a+D_b}*M_b,$$

where $D_a$ denotes the first transmit information, $D_b$ denotes the second transmit information, $M_a$ denotes the maximum uplink duty cycle capability of the terminal device for transmission at 23 dBm on the SUL band, and $M_b$ denotes the maximum uplink duty cycle capability of the terminal device for transmission at 26 dBm on the NUL band.

Optionally, in Example 6, the network device performs uplink power control according to whether the sixth inequality holds in a case where the terminal device has a maximum transmit power of 26 dBm on the NUL band, the terminal device has a maximum transmit power of 23 dBm on the SUL band, and an electromagnetic wave Specific Absorption Rate (SAR) is met when a 100% uplink transmission is performed on the SUL band with a power of 23 dBm.

Optionally, in Example 6, the network device reduces the transmit power on the NUL band and/or the SUL band in a case where the sixth inequality does not hold.

Further, in a case where the sixth inequality does not hold, the total power on the NUL band and the SUL band is less than the first power value.

Optionally, in a case where the sixth inequality holds, the network device is capable of operating at maximum transmit power on the NUL band and/or the SUL band.

It is noted that the sixth inequality in Example 6 may be a simplification of the fourth inequality in Example 4 above when the following condition is met:

The target transmit power is 26 dBm, the terminal device has a maximum transmit power of 23 dBm on the SUL band, and the terminal device has a maximum transmit power of 26 dBm on the NUL band.

In Example 7, the network device performs uplink power control according to the first transmit information, the second transmit information, a maximum uplink duty cycle capability of the terminal device for transmission at a first transmit power on the SUL band, a maximum uplink duty cycle capability of the terminal device for transmission at a second transmit power on the NUL band, a linear value of a maximum transmit power of the terminal device on the NUL band, and a linear value of a maximum transmit power of the terminal device on the SUL band.

Optionally, in Example 7, the network device performs uplink power control according to whether a seventh inequality holds.

The seventh inequality includes:

$$\frac{1}{2}*\frac{P_a}{P_1}*D_a + \frac{P_b}{P_2}*D_b \leq \frac{\frac{1}{2}*D_a}{\frac{1}{2}*D_a+D_b}*\frac{1}{2}*M_a + \frac{D_b}{\frac{1}{2}*D_a+D_b}*M_b,$$

where $D_a$ denotes the first transmit information, $D_b$ denotes the second transmit information, $M_a$ denotes the maximum uplink duty cycle capability of the terminal device for transmission at the first transmit power on the SUL band, $M_b$ denotes the maximum uplink duty cycle capability of the terminal device for transmission at the second transmit power on the NUL band, $P_a$ denotes the linear value of the maximum transmit power of the terminal device on the NUL band, $P_b$ denotes the linear value of the maximum transmit power of the terminal device on the SUL band, $P_1$ denotes the linear value of the first transmit power, and $P_2$ denotes the linear value of the second transmit power.

Optionally, in Example 7, in a case where the seventh inequality does not hold, the network device reduces the transmit power on the NUL band and/or the SUL band.

Further, in a case where the seventh inequality does not hold, the total power on the NUL band and the SUL band is less than the first power value.

Optionally, in a case where the seventh inequality holds, the network device is capable of operating at maximum transmit power on the NUL band and/or the SUL band.

Optionally, in Example 7, the first transmit power is 23 dBm and the second transmit power is 26 dBm.

Optionally, in Example 7, when the first transmit power is 23 dBm, the second transmit power is 26 dBm, the terminal device has a maximum transmit power of 23 dBm on the SUL band, and the terminal device has a maximum transmit power of 23 dBm on the NUL band, the seventh inequality may be simplified as:

$$\frac{1}{2}*D_a + \frac{1}{2}*D_b \leq \frac{D_a}{D_a+D_b}*\frac{1}{2}*M_a + \frac{D_b}{D_a+D_b}*M_b.$$

Optionally, in Example 7, when the first transmit power is 23 dBm, the second transmit power is 26 dBm, the maximum transmit power of the terminal device on the SUL band is 26 dBm and the maximum transmit power of the terminal device on the NUL band is 26 dBm, the seventh inequality may be simplified as:

$$D_a + D_b \leq \frac{D_a}{D_a+D_b}*\frac{1}{2}*M_a + \frac{D_b}{D_a+D_b}*M_b.$$

Optionally, in Example 7, when the first transmit power is 23 dBm, the second transmit power is 26 dBm, the terminal device has a maximum transmit power of 23 dBm on the SUL band, and the terminal device has a maximum transmit power of 26 dBm on the NUL band, the seventh inequality may be simplified as:

$$\frac{1}{2}*D_a + D_b \leq \frac{\frac{1}{2}*D_a}{\frac{1}{2}*D_a+D_b}*\frac{1}{2}*M_a + \frac{D_b}{\frac{1}{2}*D_a+D_b}*M_b.$$

Optionally, in Example 7, when the first transmit power is 23 dBm, the second transmit power is 26 dBm, the terminal device has a maximum transmit power of 26 dBm on the SUL band, and the terminal device has a maximum transmit power of 23 dBm on the NUL band, the seventh inequality may be simplified as $$D_a + \frac{1}{2}*D_b \leq \frac{D_a}{D_a+\frac{1}{2}*D_b}*\frac{1}{2}*M_a + \frac{\frac{1}{2}*D_b}{D_a+\frac{1}{2}*D_b}*M_b.$$

Optionally, in Example 7, when the first transmit power is 23 dBm, the second transmit power is 26 dBm, the terminal device has a maximum transmit power of 23 dBm on the SUL band, the terminal device has a maximum transmit power of 26 dBm on the NUL band, and it is assumed that when transmission on the SUL band is performed at 23 dBm, a 100% uplink transmission may be performed and SAR can be met, the corresponding $M_a$ is 100%, the seventh inequality may be simplified as:

$$\frac{1}{2}*D_a + D_b \leq \frac{\frac{1}{2}*D_a}{\frac{1}{2}*D_a+D_b}*\frac{1}{2} + \frac{D_b}{\frac{1}{2}*D_a+D_b}*M_b.$$

Optionally, in Example 7, when the first transmit power is 23 dBm, the second transmit power is 26 dBm, the terminal device has a maximum transmit power of 23 dBm on the SUL band, the terminal device has a maximum transmit power of 26 dBm on the NUL band, it is assumed that when transmission on the SUL band is performed at 23 dBm, a 100% uplink transmission may be performed and SAR can be met, and it is assumed that when transmission on the NUL band is performed at 26 dBm, a 50% uplink transmission may be performed and SAR can be met, the corresponding $M_a$ is 100%, and the corresponding $M_b$ is 50%, the seventh inequality may be simplified as:

$$\frac{1}{2}*D_a + D_b \leq \frac{\frac{1}{2}*D_a}{\frac{1}{2}*D_a+D_b}*\frac{1}{2} + \frac{D_b}{\frac{1}{2}*D_a+D_b}*\frac{1}{2}.$$

Optionally, in Examples 1 to 7 above, the first power value is pre-configured or is specified by a protocol; or, the first power value is configured by the network device. For example, the first power value is 23 dBm, or the first power value is energy class (power class) 3.

It is noted that in the above examples, $M_a$ is the maximum uplink duty cycle capability of the terminal device when operating at a high power (transmit power greater than 23 dBm, for example 26 dBm) on the SUL band, and $M_b$ is the maximum uplink duty cycle capability of the terminal device when operating at a high power (transmit power greater than 23 dBm, for example 26 dBm) on the NUL band.

Optionally, the terminal device may report Ma and Mb to the network device, so that the network device may also perform uplink power control for the terminal device based on the schemes in Examples 1 to 7 above.

Optionally, if the terminal device does not report Ma and Mb to the network device, the network device may take a default value of 50% for Ma and a default value of 50% for Mb when performing uplink power control for that terminal device based on the schemes in Examples 1 to 7 above.

It should be noted that for a frequency band that cannot perform transmission to 26 dBm (such as the SUL band), it can be approximated by a situation where the SAR can be met by the terminal at 23 dBm.

For example, if the terminal can meet SAR with a 100% transmit time percentage at 23 dBm, then its maximum uplink time percentage capability at 26 dBm may be approximated as 50%.

Another example, if the terminal can meet SAR with a 80% transmit time percentage at 23 dBm, then its maximum uplink time percentage capability at 26 dBm may be approximated as 40%.

It is also noted that the linear value of the transmit power 23 dBm is approximated as 200 mW and the linear value of the transmit power 26 dBm is approximated as 400 mW.

Optionally, in some embodiments, the first transmit information includes the transmit power and transmit time of the terminal device on the NUL band during the first time period, and the second transmit information includes the transmit power and transmit time of the terminal device on the SUL band during the first time period.

Optionally, in a case where the first transmit information includes the transmit power and transmit time of the terminal device on the NUL band during the first time period, and the second transmit information includes the transmit power and transmit time of the terminal device on the SUL band during the first time period, S310 may specifically be as follows:

the network device determines an energy accumulative value during the first time period according to the first transmit information and the second transmit information; and in a case where the energy accumulative value is greater than a first threshold value, the network device reduces a transmit power on the NUL band and/or the SUL band, and a total power on the NUL band and the SUL band is less than a first power value.

Optionally, in a case where the energy accumulative value is smaller than or equal to the first threshold value, the network device is capable of operating at the maximum transmit power on the NUL band and/or the SUL band.

Optionally, the first transmit information and the second transmit information may be reported by the terminal device, or the first transmit information and the second transmit information may be obtained by the network device.

Optionally, the network device determines the energy accumulative value during the first time period according to Equation 1 as follows:

$$\sum_{i=1}^{N} (P_i * T_i)$$

Equation 1 where i denotes an i-th transmission of the terminal device during the first time period, N is a total number of transmissions of the terminal device during the first time period, $P_i$ denotes an average power of the i-th transmission, and $T_i$ denotes a length of time of the i-th transmission.

Optionally, the first threshold value is an accumulative energy threshold value not exceeding an electromagnetic wave Specific Absorption Rate (SAR) indicator during the first time period.

Optionally, the first threshold value is pre-configured or specified by a protocol, or the first threshold value is configured by a network device, or the first threshold value is determined by the terminal device.

Optionally, if the first threshold value is determined by the terminal device, the terminal device reports the first threshold to the network device. Accordingly, the network device can obtain the first threshold value, and thus the network device performs power control based on the first threshold value.

Optionally, in a case where the energy accumulative value is greater than the first threshold value, the terminal device sends first indication information to the network device. The first indication information is used to indicate that a power back-off has occurred in the NUL band and/or the SUL band.

Optionally, the first indication information includes a power back-off value for the NUL band and/or the SUL band. Accordingly, the network device can accurately know the power control situation of the terminal device.

The method embodiments of the present disclosure are described in detail above in conjunction with FIGS. 3 and 4, and the device embodiments of the present disclosure will be described in detail below in conjunction with FIGS. 5 to 9. It should be understood that the device embodiments and the method embodiments correspond to each other, and for similar descriptions, reference can be made to the previous method embodiments.

FIG. 5 is a schematic block diagram of a terminal device 400 according to an embodiment of the present disclosure. As shown in FIG. 5, the terminal device 400 includes a processing unit 410.

The processing unit 410 is configured to perform uplink power control according to first transmit information and second transmit information, wherein the first transmit information is transmit information of the terminal device on a Supplementary Uplink (SUL) band during a first time period, and the second transmit information is transmit information of the terminal device on a Normal Uplink (NUL) band during the first time period.

Optionally, the first transmit information includes a percentage of uplink transmit time of the terminal device on the SUL band during the first time period, and the second transmit information includes a percentage of uplink transmit time of the terminal device on the NUL band during the first time period.

Optionally, the processing unit 410 is configured to:

perform uplink power control according to the first transmit information, the second transmit information, and a target maximum uplink duty cycle capability;

wherein the target maximum uplink duty cycle capability is a maximum uplink duty cycle capability of the terminal device on the SUL band, or the target maximum uplink duty cycle capability is a maximum uplink duty cycle capability of the terminal device on the NUL band.

Optionally, the processing unit 410 is configured to:

perform uplink power control according to whether a first inequality holds;

wherein the first inequality includes:

$$\frac{1}{2}*D_a + D_b \leq M_b, \quad or, \quad \frac{1}{2}*D_a + D_b \leq M_a,$$

where $D_a$ denotes the first transmit information, $D_b$ denotes the second transmit information, $M_a$ denotes the maximum uplink duty cycle capability of the terminal device on the SUL band, and $M_b$ denotes the maximum uplink duty cycle capability of the terminal device on the NUL band.

Optionally, the processing unit 410 is configured to:

perform uplink power control according to whether the first inequality holds in a case where the terminal device has a maximum transmit power of 26 dBm on the NUL band, the terminal device has a maximum transmit power of 23 dBm on the SUL band and the target transmit power is 26 dBm.

Optionally, the processing unit 410 is configured to reduce the transmit power on the NUL band and/or the SUL band in a case where the first inequality does not hold.

Optionally, the processing unit 410 is configured to:

perform uplink power control according to the first transmit information, the second transmit information, a maximum uplink duty cycle capability of the terminal device on the SUL band and a maximum uplink duty cycle capability of the terminal device on the NUL band.

Optionally, the processing unit 410 is configured to:

perform uplink power control according to whether a second inequality holds;

wherein the second inequality includes:

$$\frac{M_b}{M_a} * \frac{1}{2} * D_a + D_b \le M_b, \text{ or, } \frac{1}{2} * D_a + \frac{M_a}{M_b} * D_b \le M_a,$$

where $D_a$ denotes the first transmit information, $D_b$ denotes the second transmit information, $M_a$ denotes the maximum uplink duty cycle capability of the terminal device on the SUL band, and $M_b$ denotes the maximum uplink duty cycle capability of the terminal device on the NUL band.

Optionally, the processing unit 410 is configured to:

perform uplink power control according to whether the second inequality holds in a case where the terminal device has a maximum transmit power of 26 dBm on the NUL band, the terminal device has a maximum transmit power of 23 dBm on the SUL band, and the target transmit power is 26 dBm.

Optionally, the processing unit 410 is configured to:

reduce a transmit power on the NUL band and/or the SUL band in a case where the second inequality does not hold.

Optionally, the processing unit 410 is configured to:

perform uplink power control according to the first transmit information, the second transmit information, the maximum uplink duty cycle capability of the terminal device on the SUL band, the maximum uplink duty cycle capability of the terminal device on the NUL band, a linear value of a maximum transmit power of the terminal device on the NUL band, and a linear value of a maximum transmit power of the terminal device on the SUL band.

Optionally, the processing unit 410 is configured to:

perform uplink power control according to whether a third inequality holds;

wherein the third inequality includes:

$$\frac{M_b}{M_a} * \frac{P_a}{P_o} * D_a + \frac{P_b}{P_o} * D_b \le M_b, \text{ or, } \frac{P_a}{P_o} * D_a + \frac{M_a}{M_b} * \frac{P_b}{P_o} * D_b \le M_a,$$

where $D_a$ denotes the first transmit information, $D_b$ denotes the second transmit information, $M_a$ denotes the maximum uplink duty cycle capability of the terminal device on the SUL band, $M_b$ denotes the maximum uplink duty cycle capability of the terminal device on the NUL band, $P_a$ denotes the linear value of the maximum transmit power of the terminal device on the SUL band, $P_b$ denotes the linear value of the maximum transmit power of the terminal device on the NUL band, and $P_o$ denotes a linear value of a target transmit power.

Optionally, the processing unit 410 is configured to:

reduce a transmit power on the NUL band and/or the SUL band in a case where the third inequality does not hold.

Optionally, the processing unit 410 is configured to:

perform uplink power control according to the first transmit information, the second transmit information, a maximum uplink duty cycle capability of the terminal device on the SUL band, a maximum uplink duty cycle capability of the terminal device on the NUL band, a linear value of a maximum transmit power of the terminal device on the NUL band, and a linear value of a maximum transmit power of the terminal device on the SUL band.

Optionally, the processing unit 410 is configured to:

perform uplink power control according to whether a fourth inequality holds;

wherein the fourth inequality includes:

$$\frac{P_a}{P_o} * D_a + \frac{P_b}{P_o} * D_b \le \frac{\frac{P_a}{P_o} * D_a}{\frac{P_a}{P_o} * D_a + \frac{P_b}{P_o} * D_b} * M_a + \frac{\frac{P_b}{P_o} * D_b}{\frac{P_a}{P_o} * D_a + \frac{P_b}{P_o} * D_b} * M_b,$$

where $D_a$ denotes the first transmit information, $D_b$ denotes the second transmit information, $M_a$ denotes the maximum uplink duty cycle capability of the terminal device on the SUL band, $M_b$ denotes the maximum uplink duty cycle capability of the terminal device on the NUL band, $P_a$ denotes the linear value of the maximum transmit power of the terminal device on the SUL band, $P_b$ denotes the linear value of the maximum transmit power of the terminal device on the NUL band, and $P_o$ denotes a linear value of a target transmit power.

Optionally, the target transmit power is 23 dBm or 26 dBm.

Optionally, the processing unit 410 is configured to:

reduce a transmit power on the NUL band and/or the SUL band in a case where the fourth inequality does not hold.

Optionally, the processing unit 410 is configured to:

perform uplink power control according to whether a fifth inequality holds;

wherein the fifth inequality includes:

$$\frac{1}{2} * D_a + D_b \le \frac{1}{2},$$

where $D_a$ denotes the first transmit information and $D_b$ denotes the second transmit information.

Optionally, the processing unit 410 is configured to:

perform uplink power control according to whether the fifth inequality holds in a case where the terminal device has a maximum transmit power of 26 dBm on the NUL band, the terminal device has a maximum transmit power of 23 dBm on the SUL band, an electromagnetic wave Specific Absorption Rate (SAR) is met when a 100% uplink transmission is performed on the SUL band with a power of 23 dBm, and an SAR is met when a 50% uplink transmission is performed on the NUL band with a power of 26 dBm.

Optionally, the processing unit 410 is configured to:

reduce a transmit power on the NUL band and/or the SUL band in a case where the fifth inequality does not hold.

Optionally, the processing unit 410 is configured to:

perform uplink power control according to the first transmit information, the second transmit information, a maximum uplink duty cycle capability of the terminal device for transmission at 23 dBm on the SUL band, and a maximum uplink duty cycle capability of the terminal device for transmission at 26 dBm on the NUL band.

Optionally, the processing unit 410 is configured to:

perform uplink power control according to whether a sixth inequality holds;

wherein the sixth inequality includes:

$$\frac{1}{2}*D_a + D_b \le \frac{\frac{1}{2}*D_a}{\frac{1}{2}*D_a + D_b}*M_a + \frac{D_b}{\frac{1}{2}*D_a + D_b}*M_b,$$

where $D_a$ denotes the first transmit information, $D_b$ denotes the second transmit information, $M_a$ denotes the maximum uplink duty cycle capability of the terminal device for transmission at 23 dBm on the SUL band, and $M_b$ denotes the maximum uplink duty cycle capability of the terminal device for transmission at 26 dBm on the NUL band.

Optionally, the processing unit 410 is configured to:

perform uplink power control according to whether the sixth inequality holds in a case where the terminal device has a maximum transmit power of 26 dBm on the NUL band, the terminal device has a maximum transmit power of 23 dBm on the SUL band, and an electromagnetic wave Specific Absorption Rate (SAR) is met when a 100% uplink transmission is performed on the SUL band with a power of 23 dBm.

Optionally, the processing unit 410 is configured to:

reduce a transmit power on the NUL band and/or the SUL band in a case where the sixth inequality does not hold.

Optionally, the processing unit 410 is configured to:

perform uplink power control according to the first transmit information, the second transmit information, a maximum uplink duty cycle capability of the terminal device for transmission at a first transmit power on the SUL band, a maximum uplink duty cycle capability of the terminal device for transmission at a second transmit power on the NUL band, a linear value of a maximum transmit power of the terminal device on the NUL band, and a linear value of a maximum transmit power of the terminal device on the SUL band.

Optionally, the processing unit 410 is configured to:

perform uplink power control according to whether a seventh inequality holds;

wherein the seventh inequality includes:

$$\frac{1}{2}*\frac{P_a}{P_1}*D_a + \frac{P_b}{P_2}*D_b \le \frac{\frac{1}{2}*D_a}{\frac{1}{2}*D_a + D_b}*\frac{1}{2}*M_a + \frac{D_b}{\frac{1}{2}*D_a + D_b}*M_b,$$

where $D_a$ denotes the first transmit information, $D_b$ denotes the second transmit information, $M_a$ denotes the maximum uplink duty cycle capability of the terminal device for transmission at the first transmit power on the SUL band, $M_b$ denotes the maximum uplink duty cycle capability of the terminal device for transmission at the second transmit power on the NUL band, $P_a$ denotes the linear value of the maximum transmit power of the terminal device on the NUL band, $P_b$ denotes the linear value of the maximum transmit power of the terminal device on the SUL band, $P_1$ denotes the linear value of the first transmit power, and $P_2$ denotes the linear value of the second transmit power.

Optionally, the processing unit 410 is configured to:

reduce a transmit power on the NUL band and/or the SUL band in a case where the seventh inequality does not hold.

Optionally, the first transmit power is 23 dBm and the second transmit power is 26 dBm.

Optionally, the first transmit information includes a transmit power and transmit time of the terminal device on the NUL band during the first time period, and the second transmit information includes a transmit power and transmit time of the terminal device on the SUL band during the first time period.

Optionally, the processing unit 410 is configured to:

determine an energy accumulative value during the first time period according to the first transmit information and the second transmit information; and in a case where the energy accumulative value is greater than a first threshold value, reduce a transmit power on the NUL band and/or the SUL band.

Optionally, the processing unit 410 is configured to:

determine the energy accumulative value during the first time period according to the following formula:

$$\sum_{i=1}^{N} (p_i * T_i),$$

where i denotes an i-th transmission of the terminal device during the first time period, N is a total number of transmissions of the terminal device during the first time period, $P_i$ denotes an average power of the i-th transmission, and $T_i$ denotes a length of time of the i-th transmission.

Optionally, the first threshold value is an accumulative energy threshold value not exceeding an electromagnetic wave Specific Absorption Rate (SAR) indicator during the first time period.

Optionally, the first threshold value is pre-configured or specified by a protocol, or the first threshold value is configured by a network device, or the first threshold value is determined by the terminal device.

Optionally, the terminal device further includes a communication unit 420. In response to that the first threshold value is determined by the terminal device, the communication unit 420 is configured to report the first threshold value.

Optionally, the terminal device further includes a communication unit 420 configured to:

in a case where the energy accumulative value is greater than the first threshold value, send first indication information, wherein the first indication information is used to indicate that a power back-off has occurred in the NUL band and/or the SUL band.

Optionally, the first indication information includes a power back-off value for the NUL band and/or the SUL band.

Optionally, the first time period is pre-configured or is specified by a protocol, or the first time period is configured by a network device.

Optionally, in some embodiments, the above communication unit may be a communication interface or a transceiver, or an input/output interface of a communication chip or system-on-a-chip. The above processing unit may be one or more processors.

It should be understood that the terminal device 400 according to the embodiments of the present disclosure may correspond to the terminal device in the method embodiments of the present disclosure, and that the above and other operations and/or functions of the individual units in the terminal device 400 are respectively intended to implement the corresponding processes of the terminal device in the method 200 shown in FIG. 3, and repeated description is omitted here for brevity.

Figure 6:
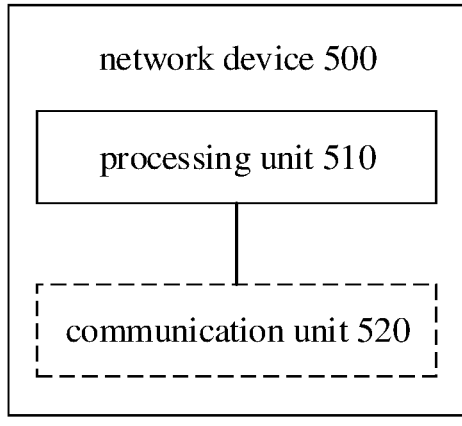
FIG. 6 is a schematic block diagram of a network device according to an embodiment of the present disclosure.

FIG. 6 is a schematic block diagram of a network device 500 according to an embodiment of the present disclosure. As shown in FIG. 6, the network device 500 includes a processing unit 510.

The processing unit 510 is configured to: perform uplink power control according to first transmit information and second transmit information, wherein the first transmit information is transmit information of a terminal device on a Supplementary Uplink (SUL) band during a first time period, and the second transmit information is transmit information of the terminal device on a Normal Uplink (NUL) band during the first time period.

Optionally, the first transmit information includes a percentage of uplink transmit time of the terminal device on the SUL band during the first time period, and the second transmit information includes a percentage of uplink transmit time of the terminal device on the NUL band during the first time period.

Optionally, the processing unit 510 is configured to:

perform uplink power control according to the first transmit information, the second transmit information, and a target maximum uplink duty cycle capability;

where the target maximum uplink duty cycle capability is a maximum uplink duty cycle capability of the terminal device on the SUL band, or the target maximum uplink duty cycle capability is a maximum uplink duty cycle capability of the terminal device on the NUL band.

Optionally, the processing unit 510 is configured to:

perform uplink power control according to whether a first inequality holds;

wherein the first inequality includes:

$$\frac{1}{2} * D_a + D_b \le M_b, \ or, \ \frac{1}{2} * D_a + D_b \le M_a,$$

where $D_a$ denotes the first transmit information, $D_b$ denotes the second transmit information, $M_a$ denotes the maximum uplink duty cycle capability of the terminal device on the SUL band, and $M_b$ denotes the maximum uplink duty cycle capability of the terminal device on the NUL band.

Optionally, the processing unit 510 is configured to:

perform uplink power control according to whether the first inequality holds in a case where the terminal device has a maximum transmit power of 26 dBm on the NUL band and the terminal device has a maximum transmit power of 23 dBm on the SUL band and the target transmit power is 26 dBm.

Optionally, the processing unit 510 is configured to:

reduce a transmit power on the NUL band and/or the SUL band in a case where the first inequality does not hold.

Optionally, the processing unit 510 is configured to:

perform uplink power control according to the first transmit information, the second transmit information, a maximum uplink duty cycle capability of the terminal device on the SUL band and a maximum uplink duty cycle capability of the terminal device on the NUL band.

Optionally, the processing unit 510 is configured to:

perform uplink power control according to whether a second inequality holds;

wherein the second inequality includes:

$$\frac{M_b}{M_a} * \frac{1}{2} * D_a + D_b \le M_b, \ or, \ \frac{1}{2} * D_a + \frac{M_a}{M_b} * D_b \le M_a,$$

where $D_a$ denotes the first transmit information, $D_b$ denotes the second transmit information, $M_a$ denotes the maximum uplink duty cycle capability of the terminal device on the SUL band, and $M_b$ denotes the maximum uplink duty cycle capability of the terminal device on the NUL band.

Optionally, the processing unit 510 is configured to:

perform uplink power control according to whether the second inequality holds in a case where the terminal device has a maximum transmit power of 26 dBm on the NUL band and the terminal device has a maximum transmit power of 23 dBm on the SUL band and the target transmit power is 26 dBm.

Optionally, the processing unit 510 is configured to:

reduce a transmit power on the NUL band and/or the SUL band in a case where the second inequality does not hold.

Optionally, the processing unit 510 is configured to:

perform uplink power control according to the first transmit information, the second transmit information, the maximum uplink duty cycle capability of the terminal device on the SUL band, the maximum uplink duty cycle capability of the terminal device on the NUL band, a linear value of a maximum transmit power of the terminal device on the NUL band, and a linear value of a maximum transmit power of the terminal device on the SUL band.

Optionally, the processing unit 510 is configured to:

perform uplink power control according to whether a third inequality holds;

wherein the third inequality includes:

$$\frac{M_b}{M_a} * \frac{P_a}{P_o} * D_a + \frac{P_b}{P_o} * D_b \le M_b, \ or, \ \frac{P_a}{P_o} * D_a + \frac{M_a}{M_b} * \frac{P_b}{P_o} * D_b \le M_a,$$

where $D_a$ denotes the first transmit information, $D_b$ denotes the second transmit information, $M_a$ denotes the maximum uplink duty cycle capability of the terminal device on the SUL band, $M_b$ denotes the maximum uplink duty cycle capability of the terminal device on the NUL band, $P_a$ denotes the linear value of the maximum transmit power of the terminal device on the SUL band, $P_b$ denotes the linear value of the maximum transmit power of the terminal device on the NUL band, and $P_o$ denotes a linear value of a target transmit power.

Optionally, the processing unit 510 is configured to:

reduce a transmit power on the NUL band and/or the SUL band in a case where the third inequality does not hold.

Optionally, the processing unit 510 is configured to:

perform uplink power control according to the first transmit information, the second transmit information, a maximum uplink duty cycle capability of the terminal device on the SUL band, a maximum uplink duty cycle capability of the terminal device on the NUL band, a linear value of a maximum transmit power of the terminal device on the NUL band, and a linear value of a maximum transmit power of the terminal device on the SUL band.

Optionally, the processing unit 510 is configured to:

perform uplink power control according to whether a fourth inequality holds;

wherein the fourth inequality includes:

$$\frac{P_a}{P_o}*D_a + \frac{P_b}{P_o}*D_b \le \frac{\frac{P_a}{P_o}*D_a}{\frac{P_a}{P_o}*D_a + \frac{P_b}{P_o}*D_b}*M_a + \frac{\frac{P_b}{P_o}*D_b}{\frac{P_a}{P_o}*D_a + \frac{P_b}{P_o}*D_b}*M_b,$$

where $D_a$ denotes the first transmit information, $D_b$ denotes the second transmit information, $M_a$ denotes the maximum uplink duty cycle capability of the terminal device on the SUL band, $M_b$ denotes the maximum uplink duty cycle capability of the terminal device on the NUL band, $P_a$ denotes the linear value of the maximum transmit power of the terminal device on the SUL band, $P_b$ denotes the linear value of the maximum transmit power of the terminal device on the NUL band, and $P_o$ denotes a linear value of a target transmit power.

Optionally, the target transmit power is 23 dBm or 26 dBm.

Optionally, the processing unit 510 is configured to:

reduce a transmit power on the NUL band and/or the SUL band in a case where the fourth inequality does not hold.

Optionally, the processing unit 510 is configured to:

perform uplink power control according to whether a fifth inequality holds;

wherein the fifth inequality includes:

$$\frac{1}{2}*D_a + D_b \le \frac{1}{2},$$

where $D_a$ denotes the first transmit information and $D_b$ denotes the second transmit information.

Optionally, the processing unit 510 is configured to:

perform uplink power control according to whether the fifth inequality holds in a case where the terminal device has a maximum transmit power of 26 dBm on the NUL band, the terminal device has a maximum transmit power of 23 dBm on the SUL band, an electromagnetic wave Specific Absorption Rate (SAR) is met when a 100% uplink transmission is performed on the SUL band with a power of 23 dBm, and an SAR is met when a 50% uplink transmission is performed on the NUL band with a power of 26 dBm.

Optionally, the processing unit 510 is configured to:

reduce a transmit power on the NUL band and/or the SUL band in a case where the fifth inequality does not hold.

Optionally, the processing unit 510 is configured to:

perform uplink power control according to the first transmit information, the second transmit information, a maximum uplink duty cycle capability of the terminal device for transmission at 23 dBm on the SUL band, and a maximum uplink duty cycle capability of the terminal device for transmission at 26 dBm on the NUL band.

Optionally, the processing unit 510 is configured to:

perform uplink power control according to whether a sixth inequality holds;

wherein the sixth inequality includes:

$$\frac{1}{2}*D_a + D_b \le \frac{\frac{1}{2}*D_a}{\frac{1}{2}*D_a + D_b}*M_a + \frac{D_b}{\frac{1}{2}*D_a + D_b}*M_b,$$

where $D_a$ denotes the first transmit information, $D_b$ denotes the second transmit information, $M_a$ denotes the maximum uplink duty cycle capability of the terminal device for transmission at 23 dBm on the SUL band, and $M_b$ denotes the maximum uplink duty cycle capability of the terminal device for transmission at 26 dBm on the NUL band.

Optionally, the processing unit 510 is configured to:

perform uplink power control according to whether the sixth inequality holds in a case where the terminal device has a maximum transmit power of 26 dBm on the NUL band, the terminal device has a maximum transmit power of 23 dBm on the SUL band, and an electromagnetic wave Specific Absorption Rate (SAR) is met when a 100% uplink transmission is performed on the SUL band with a power of 23 dBm.

Optionally, the processing unit 510 is configured to:

reduce a transmit power on the NUL band and/or the SUL band in a case where the sixth inequality does not hold.

Optionally, the processing unit 510 is configured to:

perform uplink power control according to the first transmit information, the second transmit information, a maximum uplink duty cycle capability of the terminal device for transmission at a first transmit power on the SUL band, a maximum uplink duty cycle capability of the terminal device for transmission at a second transmit power on the NUL band, a linear value of a maximum transmit power of the terminal device on the NUL band, and a linear value of a maximum transmit power of the terminal device on the SUL band.

Optionally, the processing unit 510 is configured to:

perform uplink power control according to whether a seventh inequality holds;

wherein the seventh inequality includes:

$$\frac{1}{2}*\frac{P_a}{P_1}*D_a+\frac{P_b}{P_2}*D_b\leq\frac{\frac{1}{2}*D_a}{\frac{1}{2}*D_a+D_b}*\frac{1}{2}*M_a+\frac{D_b}{\frac{1}{2}*D_a+D_b}*M_b,$$

where $D_a$ denotes the first transmit information, $D_b$ denotes the second transmit information, $M_a$ denotes the maximum uplink duty cycle capability of the terminal device for transmission at the first transmit power on the SUL band, $M_b$ denotes the maximum uplink duty cycle capability of the terminal device for transmission at the second transmit power on the NUL band, $P_a$ denotes the linear value of the maximum transmit power of the terminal device on the NUL band, $P_b$ denotes the linear value of the maximum transmit power of the terminal device on the SUL band, $P_1$ denotes the linear value of the first transmit power, and $P_2$ denotes the linear value of the second transmit power.

Optionally, the processing unit 510 is configured to: reduce a transmit power on the NUL band and/or the SUL band in a case where the seventh inequality does not hold.

Optionally, the first transmit power is 23 dBm and the second transmit power is 26 dBm.

Optionally, the network device further includes a communication unit 520 configured to:

receive first information from the terminal device, wherein the first information includes at least one of:

a maximum uplink duty cycle capability of the terminal device on the SUL band, and a maximum uplink duty cycle capability of the terminal device on the NUL band.

Optionally, a default value of the maximum uplink duty cycle capability of the terminal device on the SUL band is 50%, and a default value of the maximum uplink duty cycle capability of the terminal device on the NUL band is 50%.

Optionally, the first transmit information includes a transmit power and transmit time of the terminal device on the NUL band during the first time period, and the second transmit information includes a transmit power and transmit time of the terminal device on the SUL band during the first time period.

Optionally, the processing unit 510 is configured to: determine an energy accumulative value during the first time period according to the first transmit information and the second transmit information; and in a case where the energy accumulative value is greater than a first threshold value, reduce a transmit power on the NUL band and/or the SUL band.

Optionally, the processing unit 510 is configured to: determine the energy accumulative value during the first time period according to the following formula:

$$\sum_{i=1}^{N}(p_i*T_i),$$

where i denotes an i-th transmission of the terminal device during the first time period, N is a total number of transmissions of the terminal device during the first time period, $P_i$ denotes an average power of the i-th transmission, and $T_i$ denotes a length of time of the i-th transmission.

Optionally, the first threshold value is an accumulative energy threshold value not exceeding an electromagnetic wave Specific Absorption Rate (SAR) indicator during the first time period.

Optionally, the first threshold value is pre-configured or specified by a protocol, or the first threshold value is configured by a network device, or the first threshold value is determined by the terminal device.

Optionally, the network device further includes a communication unit 520 configured to:

in response to that the first threshold value is determined by the terminal device, receive the first threshold value reported by the terminal device.

Optionally, the network device further includes a communication unit 520 configured to:

in a case where the energy accumulative value is greater than the first threshold value, receive first indication information sent from the terminal device, wherein the first indication information is used to indicate that a power back-off has occurred in the NUL band and/or the SUL band.

Optionally, the first indication information includes a power back-off value for the NUL band and/or the SUL band.

Optionally, the first time period is pre-configured or is specified by a protocol, or the first time period is configured by a network device.

Optionally, in some embodiments, the above communication unit may be a communication interface or a transceiver, or an input/output interface of a communication chip or system-on-a-chip. The above processing unit may be one or more processors.

It should be understood that the network device 500 according to the embodiments of the present disclosure may correspond to the network device in the method embodiments of the present disclosure, and that the above and other operations and/or functions of the individual units in the network device 500 are respectively intended to implement the corresponding processes of the terminal device in the method 300 shown in FIG. 4, and repeated description is omitted here for brevity.

Figure 7:
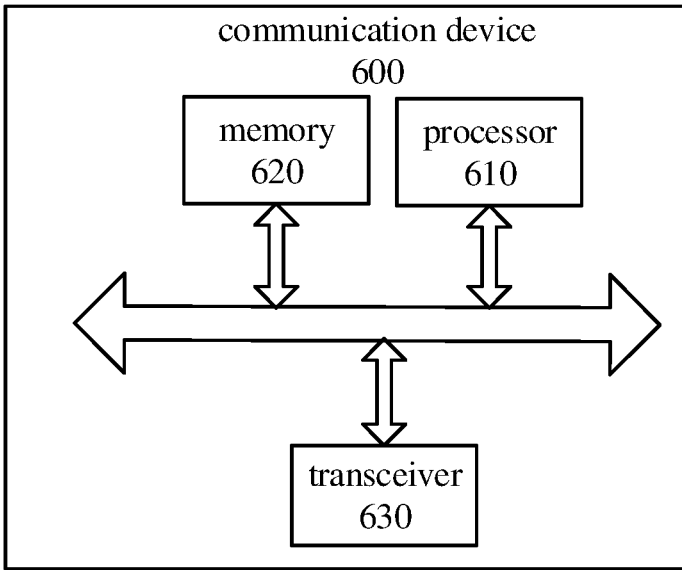
FIG. 7 is a schematic block diagram of a communication device according to an embodiment of the present disclosure.

FIG. 7 is a schematic structural diagram of a communication device 600 according to an embodiment of the present disclosure. The communication device 600 shown in FIG. 7 includes a processor 610, and the processor 610 may call and run a computer program from a memory to perform the method in embodiments of the present disclosure.

According to embodiments, as shown in FIG. 7, the communication device 600 may further include a memory 620. The processor 610 may call and run a computer program from the memory 620 to perform the method in embodiments of the present disclosure.

The memory 620 may be a separate device independent of the processor 610, or may be integrated in the processor 610.

According to embodiments, as shown in FIG. 7, the communication device 600 may further include a transceiver 630, and the processor 610 may control the transceiver 630 to communicate with other devices. Specifically, the transceiver may send information or data to other devices, or receive information or data sent by other devices.

The transceiver 630 may include a transmitter and a receiver. The transceiver 630 may further include one or more antennas.

According to embodiments, the communication device 600 may specifically be the network device according to an embodiment of the present disclosure, and the communication device 600 may implement the corresponding processes implemented by the network device in the method embodiments of the present disclosure.

According to embodiments, the communication device 600 may specifically be the mobile terminal/terminal device in embodiments of the present disclosure, and the communication device 600 may implement the corresponding processes implemented by the mobile terminal/terminal device in the method embodiments of the present disclosure. For brevity, details are not repeated here.

Figure 8:
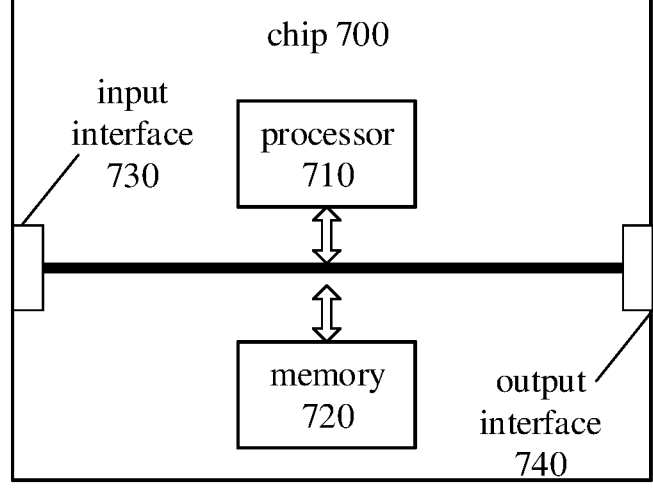
FIG. 8 is a schematic block diagram of an apparatus according to an embodiment of the present disclosure.

FIG. 8 is a schematic structural diagram of a chip according to an embodiment of the present disclosure. The apparatus 700 shown in FIG. 8 includes a processor 710, and the processor 710 can call and run a computer program from a memory to implement the method according to embodiments of the present disclosure.

According to embodiments, as shown in FIG. 8, the apparatus 700 may further include a memory 720. The processor 710 may call and run a computer program from the memory 720 to implement the method according to embodiments of the present disclosure.

The memory 720 may be a separate device independent of the processor 710, or may be integrated in the processor 710.

According to embodiments, the apparatus 700 may further include an input interface 730. The processor 710 may control the input interface 730 to communicate with other apparatus or chips, and specifically, the processor 710 can control the input interface to obtain information or data sent by other apparatus or chips.

According to embodiments, the apparatus 700 may further include an output interface 740. The processor 710 can control the output interface 740 to communicate with other apparatus or chips, and specifically, the processor 710 can control the output interface 740 to output information or data to other apparatus or chips.

According to embodiments, the apparatus can be applied to the network device in embodiments of the present disclosure, and the apparatus can implement the corresponding processes implemented by the network device in various methods according to embodiments of the present disclosure. For brevity, details are not repeated herein again.

According to embodiments, the apparatus can be applied to the mobile terminal/terminal device in embodiments of the present disclosure, and the apparatus can implement the corresponding processes implemented by the mobile terminal/terminal device in various methods according to embodiments of the present disclosure. For brevity, details are not repeated herein again.

It should be understood that the apparatus in the embodiments of the present disclosure may be a chip, or may also be referred to as a system-level chip, a system chip, a chip system, or a system-on-chip, etc.

Figure 9:
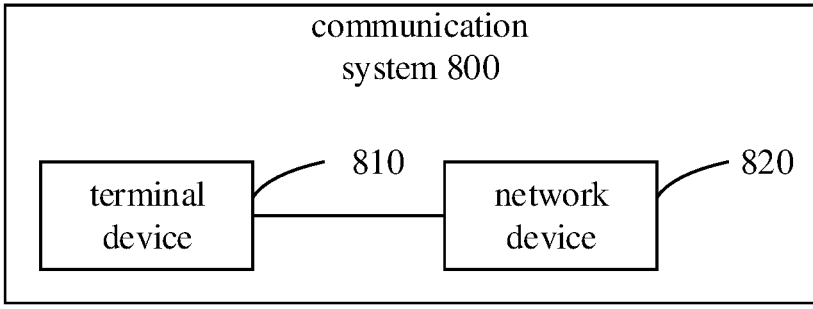
FIG. 9 is a schematic block diagram of a communication system according to an embodiment of the present disclosure.

FIG. 9 is a schematic block diagram of a communication system 800 according to an embodiment of the present disclosure. As shown in FIG. 9, the communication system 800 includes a terminal device 810 and a network device 820.

The terminal device 810 can be used to implement the corresponding functions implemented by the terminal device in the above method embodiments, and the network device 820 can be used to implement the corresponding functions implemented by the network device in the above method embodiments. For brevity, details are not repeated here.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the mobile terminal/terminal device in embodiments of the present disclosure, and the computer programs cause a computer to perform the corresponding processes implemented by the mobile terminal/ terminal device in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the mobile terminal/terminal device in embodiments of the present disclosure, and the computer program instructions cause a computer to perform the corresponding processes implemented by the mobile terminal/terminal device in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the mobile terminal/terminal device in embodiments of the present disclosure, and when the computer program runs on a computer, the computer is caused to perform the corresponding processes implemented by the mobile terminal/terminal device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A power control method, comprising:
performing, by a network device, uplink power control according to first transmit information and second transmit information, wherein the first transmit information is transmit information of a terminal device on a Supplementary Uplink (SUL) band during a first time period, and the second transmit information is transmit information of the terminal device on a Normal Uplink (NUL) band during the first time period;
wherein the first transmit information comprises a percentage of uplink transmit time of the terminal device on the SUL band during the first time period, and the second transmit information comprises a percentage of uplink transmit time of the terminal device on the NUL band during the first time period.

2. The method according to claim 1, wherein performing, by the network device, uplink power control according to the first transmit information and the second transmit information comprises:
performing, by the network device, uplink power control according to the first transmit information, the second transmit information, and a target maximum uplink duty cycle capability;
wherein the target maximum uplink duty cycle capability is a maximum uplink duty cycle capability of the terminal device on the SUL band, or the target maximum uplink duty cycle capability is a maximum uplink duty cycle capability of the terminal device on the NUL band.

3. The method according to claim 2, wherein performing, by the network device, uplink power control according to the first transmit information, the second transmit information, and the target maximum uplink duty cycle capability comprises:

performing, by the network device, uplink power control according to whether a first inequality holds;

wherein the first inequality comprises:

$$\frac{1}{2} * D_a + D_b \le M_b, \text{ or, } \frac{1}{2} * D_a + D_b \le M_a,$$

where $D_a$ denotes the first transmit information, $D_b$ denotes the second transmit information, $M_a$ denotes the maximum uplink duty cycle capability of the terminal device on the SUL band, and $M_b$ denotes the maximum uplink duty cycle capability of the terminal device on the NUL band.

4. The method according to claim 3, wherein performing, by the network device, uplink power control according to whether the first inequality holds comprises:

performing, by the network device, uplink power control according to whether the first inequality holds in a case where the terminal device has a maximum transmit power of 26 dBm on the NUL band and the terminal device has a maximum transmit power of 23 dBm on the SUL band.

5. The method according to claim 3, wherein performing, by the network device, uplink power control according to whether the first inequality holds comprises:

reducing, by the network device, a transmit power on at least one of the NUL band or the SUL band in a case where the first inequality does not hold.

6. The method according to claim 1, wherein performing, by the network device, uplink power control according to the first transmit information and the second transmit information comprises:

performing, by the network device, uplink power control according to the first transmit information, the second transmit information, a maximum uplink duty cycle capability of the terminal device on the SUL band and a maximum uplink duty cycle capability of the terminal device on the NUL band.

7. The method according to claim 6, wherein performing, by the network device, uplink power control according to the first transmit information, the second transmit information, the maximum uplink duty cycle capability of the terminal device on the SUL band and the maximum uplink duty cycle capability of the terminal device on the NUL band comprises:

performing, by the network device, uplink power control according to whether a second inequality holds;

wherein the second inequality comprises:

$$\frac{M_b}{M_a} * \frac{1}{2} * D_a + D_b \le M_b, \text{ or, } \frac{1}{2} * D_a + \frac{M_a}{M_b} * D_b \le M_a,$$

where $D_a$ denotes the first transmit information, $D_b$ denotes the second transmit information, $M_a$ denotes the maximum uplink duty cycle capability of the terminal device on the SUL band, and $M_b$ denotes the maximum uplink duty cycle capability of the terminal device on the NUL band.

8. The method according to claim 7, wherein performing, by the network device, uplink power control according to whether the second inequality holds comprises:

performing, by the network device, uplink power control according to whether the second inequality holds in a case where the terminal device has a maximum transmit power of 26 dBm on the NUL band and the terminal device has a maximum transmit power of 23 dBm on the SUL band.

9. The method according to claim 7, wherein performing, by the network device, uplink power control according to whether the second inequality holds comprises:

reducing, by the network device, a transmit power on at least one of the NUL band or the SUL band in a case where the second inequality does not hold.

10. The method according to claim 1, wherein performing, by the network device, uplink power control according to the first transmit information and the second transmit information comprises:

performing, by the network device, uplink power control according to whether a fifth inequality holds;

wherein the fifth inequality comprises:

$$\frac{1}{2} * D_a + D_b \le \frac{1}{2},$$

where $D_a$ denotes the first transmit information and $D_b$ denotes the second transmit information.

11. The method according to claim 10, wherein performing, by the network device, uplink power control according to whether the fifth inequality holds comprises:

performing, by the network device, uplink power control according to whether the fifth inequality holds in a case where the terminal device has a maximum transmit power of 26 dBm on the NUL band, the terminal device has a maximum transmit power of 23 dBm on the SUL band, an electromagnetic wave Specific Absorption Rate (SAR) is met when a 100% uplink transmission is performed on the SUL band with a power of 23 dBm, and an SAR is met when a 50% uplink transmission is performed on the NUL band with a power of 26 dBm.

12. The method according to claim 10, wherein performing, by the network device, uplink power control according to whether the fifth inequality holds comprises:

reducing, by the network device, a transmit power on at least one of the NUL band or the SUL band in a case where the fifth inequality does not hold.

13. A terminal device, comprising:

a processor; and a memory storing instructions executable by the processor;

wherein when the instructions are executed by the processor, the terminal device is caused to:

perform uplink power control according to first transmit information and second transmit information, wherein the first transmit information is transmit information of the terminal device on a Supplementary Uplink (SUL) band during a first time period, and the second transmit information is transmit information of the terminal device on a Normal Uplink (NUL) band during the first time period;

wherein the first transmit information comprises a percentage of uplink transmit time of the terminal device on the SUL band during the first time period, and the second transmit information comprises a percentage of uplink transmit time of the terminal device on the NUL band during the first time period.

14. A network device, comprising:

a processor; and a memory storing instructions executable by the processor;

wherein when the instructions are executed by the processor, the network device is caused to:

perform uplink power control according to first transmit information and second transmit information, wherein the first transmit information is transmit information of a terminal device on a Supplementary Uplink (SUL) band during a first time period, and the second transmit information is transmit information of the terminal device on a Normal Uplink (NUL) band during the first time period;

wherein the first transmit information comprises a percentage of uplink transmit time of the terminal device on the SUL band during the first time period, and the second transmit information comprises a percentage of uplink transmit time of the terminal device on the NUL band during the first time period.

* * * * *